US011990668B2

(12) United States Patent
Park

(10) Patent No.: US 11,990,668 B2
(45) Date of Patent: May 21, 2024

(54) ANTENNA ASSEMBLY COMPRISING ANTENNAS FORMED ON INCLINED SIDE SURFACE OF PRINTED CIRCUIT BOARD AND ELECTRONIC DEVICE COMPRISING THE SAME

(71) Applicant: Samsung Electronics Co., Ltd., Suwon-si (KR)

(72) Inventor: Sungchul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/994,213

(22) Filed: Nov. 25, 2022

(65) Prior Publication Data

US 2023/0101132 A1 Mar. 30, 2023

Related U.S. Application Data

(63) Continuation of application No. 17/320,884, filed on May 14, 2021, now Pat. No. 11,515,619, which is a (Continued)

(30) Foreign Application Priority Data

Aug. 24, 2018 (KR) ........................ 10-2018-0099375

(51) Int. Cl.

*H01Q 15/14* (2006.01)
*H01Q 1/22* (2006.01)
*H01Q 1/24* (2006.01)

(52) U.S. Cl.

CPC ........... *H01Q 1/2283* (2013.01); *H01Q 15/14* (2013.01); *H01Q 1/243* (2013.01)

(58) Field of Classification Search

CPC ........ H01Q 1/22; H01Q 1/2283; H01Q 1/241; H01Q 1/243; H01Q 15/14; H01Q 15/141; H01Q 15/18; H01Q 21/065

See application file for complete search history.

(56) References Cited

U.S. PATENT DOCUMENTS 5,200,756 A 4/1993 Feller
8,933,845 B2 1/2015 Kim et al.
(Continued)

FOREIGN PATENT DOCUMENTS

CN 102709684 A 10/2012
CN 103367877 A 10/2013
(Continued)

OTHER PUBLICATIONS

Korean Notice of Patent Grant dated Jun. 20, 2023, issued in Korean Application No. 10-2023-0061754.
(Continued)

*Primary Examiner* — Jimmy T Vu
(74) *Attorney, Agent, or Firm* — Jefferson IP Law, LLP

(57) ABSTRACT

An inclined antenna assembly and an electronic device including the antenna assembly are provided. The inclined antenna assembly and an electronic device include a communication circuit and a Printed Circuit Board (PCB) including a front face, a back face on which the communication circuit is disposed, and at least one side face having an inclined manner between the front face and the back face. According to various embodiments, the PCB may include one or more antennas formed on a region corresponding to at least one side face.

20 Claims, 29 Drawing Sheets

Related U.S. Application Data continuation of application No. 16/547,874, filed on Aug. 22, 2019, now Pat. No. 11,011,825.

(56) References Cited

U.S. PATENT DOCUMENTS

| | | | |
|---|---|---|---|
| 9,647,321 | B2 | 5/2017 | Park et al. |
| 10,205,224 | B2 | 2/2019 | Mow et al. |
| 10,290,946 | B2 | 5/2019 | Romano et al. |
| 11,011,825 | B2 | 5/2021 | Park |
| 2004/0027284 | A1 * | 2/2004 | Leeper ..................... H01Q 3/02 343/700 MS |
| 2007/0229383 | A1 | 10/2007 | Koyanagi et al. |
| 2010/0240327 | A1 | 9/2010 | Lambrecht et al. |
| 2013/0050056 | A1 | 2/2013 | Lee et al. |
| 2013/0257668 | A1 | 10/2013 | Rao et al. |
| 2016/0049734 | A1 | 2/2016 | Kim et al. |
| 2017/0294705 | A1 | 10/2017 | Khripkov et al. |
| 2018/0159208 | A1 | 6/2018 | Ameri |
| 2018/0233808 | A1 | 8/2018 | Noori et al. |
| 2018/0241430 | A1 | 8/2018 | Youn et al. |
| 2019/0089419 | A1 | 3/2019 | Kim et al. |

FOREIGN PATENT DOCUMENTS

| | | | |
|---|---|---|---|
| CN | 108155466 | A | 6/2018 |
| DE | 10 2013 204 368 | A1 | 10/2013 |
| DE | 20 2017 004 887 | U1 | 1/2018 |
| EP | 2 495 806 | A2 | 9/2012 |
| EP | 2 985 837 | A1 | 2/2016 |
| KR | 10-2011-0124677 | A | 11/2011 |
| KR | 10-2012-0102513 | A | 9/2012 |
| KR | 10-2014-0118120 | A | 10/2014 |
| KR | 10-2017-0013682 | A | 2/2017 |
| KR | 10-2017-0030196 | A | 3/2017 |
| KR | 10-2017-0083949 | A | 7/2017 |
| KR | 10-2017-0097920 | A | 8/2017 |
| KR | 10-2018-0011775 | A | 2/2018 |
| KR | 10-2018-0025066 | A | 3/2018 |

OTHER PUBLICATIONS

European Extended Search Report dated Dec. 17, 2019, issued in European Application No. 19193105.4-1205.

International Search Report and Written Opinion Report dated Dec. 23, 2019, issued in International Application No. PCT/KR2019/010668.

Chinese Office Action dated Dec. 29, 2022, issued in Chinese Patent Application No. CN201980055204.6.

Korean Notice of Patent Grant dated Feb. 15, 2023, issued in Korean Patent Application No. KR10-2018-0099375.

Extended European Search Report Nov. 7, 2023, issued in European Application No. 23186817.5-1205.

* cited by examiner

ANTENNA ASSEMBLY COMPRISING ANTENNAS FORMED ON INCLINED SIDE SURFACE OF PRINTED CIRCUIT BOARD AND ELECTRONIC DEVICE COMPRISING THE SAME

CROSS REFERENCE TO RELATED APPLICATION(S)

This application is a continuation application of prior application Ser. No. 17/320,884, filed on May 14, 2021, which application is a continuation application of prior application Ser. No. 16/547,874, filed on Aug. 22, 2019, which has issued as U.S. Pat. No. 11,011,825 on May 18, 2021 and is based on and claims priority under 35 U.S.C § 119(a) of a Korean patent application number 10-2018-0099375, filed on Aug. 24, 2018, in the Korean Intellectual Property Office, the disclosure of which is incorporated by reference herein in its entirety.

BACKGROUND

1. Field

The disclosure relates to an antenna assembly. In more detail, the disclosure relates to an antenna assembly including an antenna formed on an inclined side face of a printed circuit board, and an electronic device including the antenna assembly.

2. Description of Related Art

With the development of wireless communication technologies, electronic devices (e.g., communication electronic devices) are widely used in everyday life, and thus the use of content increases exponentially. Due to the rapid increase in the use of the content, network capacity is gradually reaching a limit. As low latency data communication is required, there is on-going development in a next generation wireless communication technology (e.g., $5^{th}$ Generation (5G) communication), a high-speed wireless communication technology such as Wireless Gigabit alliance (WIGIG) (e.g., 802.11AD), or the like.

The above information is presented as background information only to assist with an understanding of the disclosure. No determination has been made, and no assertion is made, as to whether any of the above might be applicable as prior art with regard to the disclosure.

SUMMARY

Next-generation wireless communication technologies may use a millimeter wave, which has a frequency substantially greater than or equal to 20 GHz. In order to overcome a high free space loss due to a frequency characteristic and to increase an antenna gain, a communication device including an array structure in which a plurality of antenna elements are arranged with a specific interval may be disposed inside an electronic device. As the electronic device is gradually becoming slimmer, at least some regions of antennas may overlap or be placed close to a metallic housing since the communication device is disposed on the electronic device. Accordingly, radiation performance of the antennas may decrease in the communication device.

Aspects of the disclosure are to address at least the above-mentioned problems and/or disadvantages and to provide at least the advantages described below. Accordingly, an aspect of the disclosure is to provide an antenna formed on an inclined side face of a printed circuit board, and an electronic device including the antenna assembly. Additional aspects will be set forth in part in the description which follows and, in part, will be apparent from the description, or may be learned by practice of the presented embodiments.

In accordance with an aspect of the disclosure, an antenna assembly is provided. The antenna assembly includes a communication circuit and a Printed Circuit Board (PCB) including a front face, a back face on which the communication circuit is disposed, and at least one side face having an inclined manner between the front face and the back face. According to an embodiment, the PCB may include one or more first antennas electrically coupled with the communication circuit and formed on at least one of the front face or the back face, and one or more second antennas formed on a region corresponding to the at least one side face.

In accordance with another aspect of the disclosure, an electronic device is provided. The electronic device includes a housing at least partially formed of metal, a communication circuit, and a PCB including a front face, a back face on which the communication circuit is disposed, and at least one side face having an inclined manner between the front face and the back face. According to an embodiment, the PCB may include one or more antennas formed on a region corresponding to the at least one side face, and may be disposed to face the at least part of the housing.

In accordance with another aspect of the disclosure, an electronic device is provided. The electronic device includes a communication circuit and a PCB including a front face, a back face on which the communication circuit is disposed, and at least one side face having an inclined manner between the front face and the back face. According to an embodiment, the PCB may include one or more first antennas electrically coupled with the communication circuit and formed on at least one of the front face or the back face, and one or more second antennas formed on the at least one side face.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
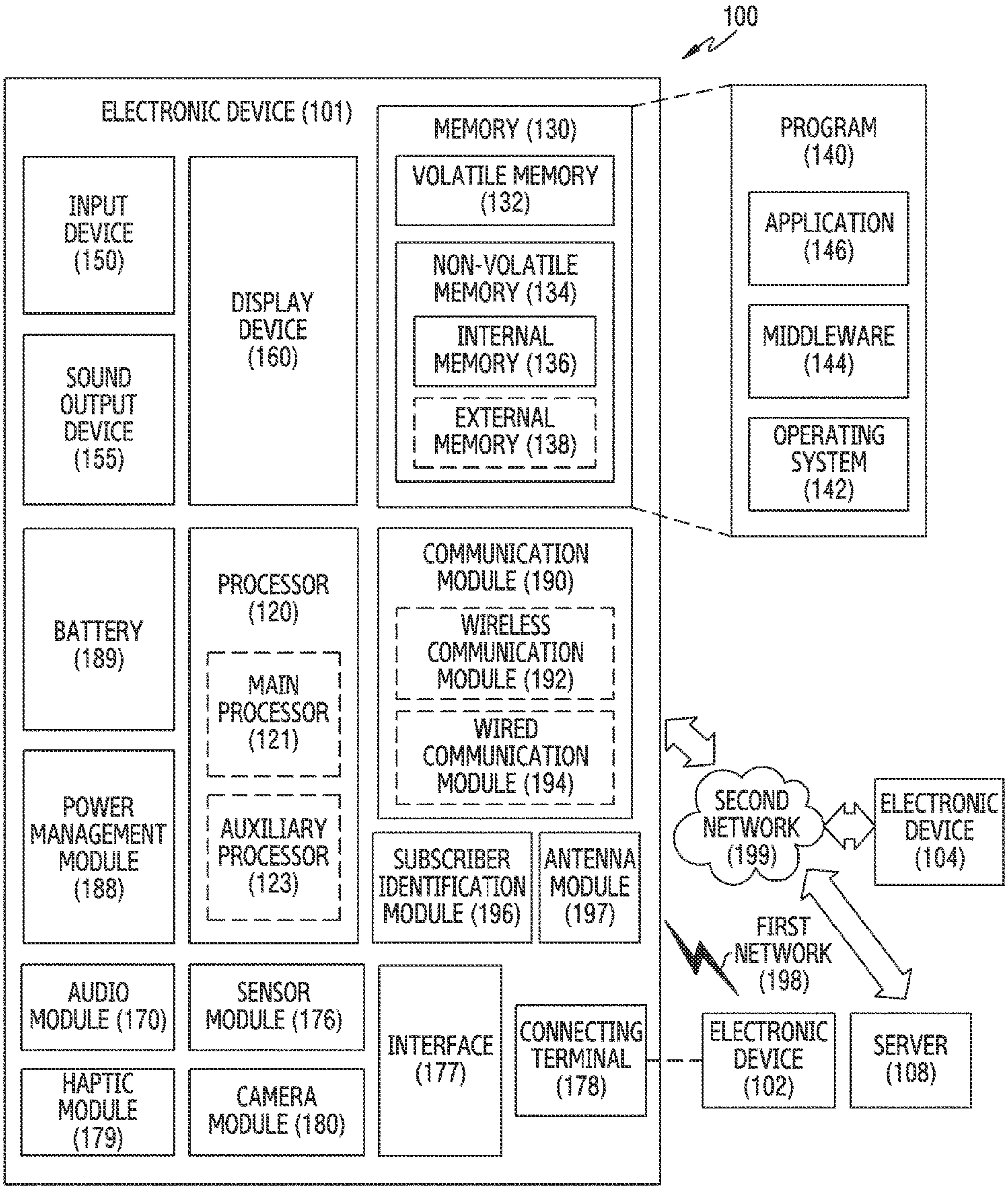
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In an embodiment, at least one (e.g., the display device 160, the camera module 180, or the like) of the components may be omitted from the electronic device 101, or one or more other components may be added in the electronic device 101. In an embodiment, some of the components may be implemented as single integrated circuitry. For example, the sensor module 176 (e.g., a fingerprint sensor, an iris sensor, an illuminance sensor, or the like) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176, the communication module 190, or the like) in a volatile memory 132, process the command or the data stored in the volatile memory 132, and store resulting data in a non-volatile memory 134. According to an embodiment, the processor 120 may include a main processor 121 (e.g., a central processing unit (CPU), an application processor (AP), or the like), and an auxiliary processor 123 (e.g., a graphics processing unit (GPU), an image signal processor (ISP), a sensor hub processor, a communication processor (CP), or the like) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, the communication module 190, or the like) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor, a communication processor, or the like) may be implemented as part of another component (e.g., the camera module 180, the communication module 190, or the like) functionally related to the auxiliary processor 123.

The memory 130 may store various data used by at least one component (e.g., the processor 120, the sensor module 176, or the like) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the electronic device 102) directly (e.g., wired) or wirelessly coupled with the electronic device 101.

The sensor module 176 may detect an operational state (e.g., power, temperature, or the like) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, or the like.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, an audio interface, or the like.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, an audio connector (e.g., a headphone connector), or the like.

The haptic module 179 may convert an electrical signal into a mechanical stimulus (e.g., a vibration, a movement, or the like) or an electrical stimulus which may be recognized by a user via a tactile sensation or kinesthetic sensation. According to an embodiment, the haptic module 179 may include, for example, a motor, a piezoelectric element, an electric stimulator, or the like.

The camera module 180 may capture a still image or moving images. According to an embodiment, the camera module 180 may include one or more lenses, image sensors, image signal processors, flashes, or the like.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, a fuel cell, or the like.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that is operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, a global navigation satellite system (GNSS) communication module, or the like) or a wired communication module 194 (e.g., a local area network (LAN) communication module, a power line communication (PLC) module, or the like). A corresponding one of these communication modules may communicate with the external electronic device via the first network 198 (e.g., a short-range communication network, such as Bluetooth™, wireless-fidelity (Wi-Fi) direct, infrared data association (IrDA), or the like)

or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI), or the like).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome to the electronic device 101. The electronic device 101 may provide the outcome, with or without further processing of the outcome, as at least part of a reply to the request. To that end, a cloud computing, distributed computing, client-server computing technology, or the like may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and may include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
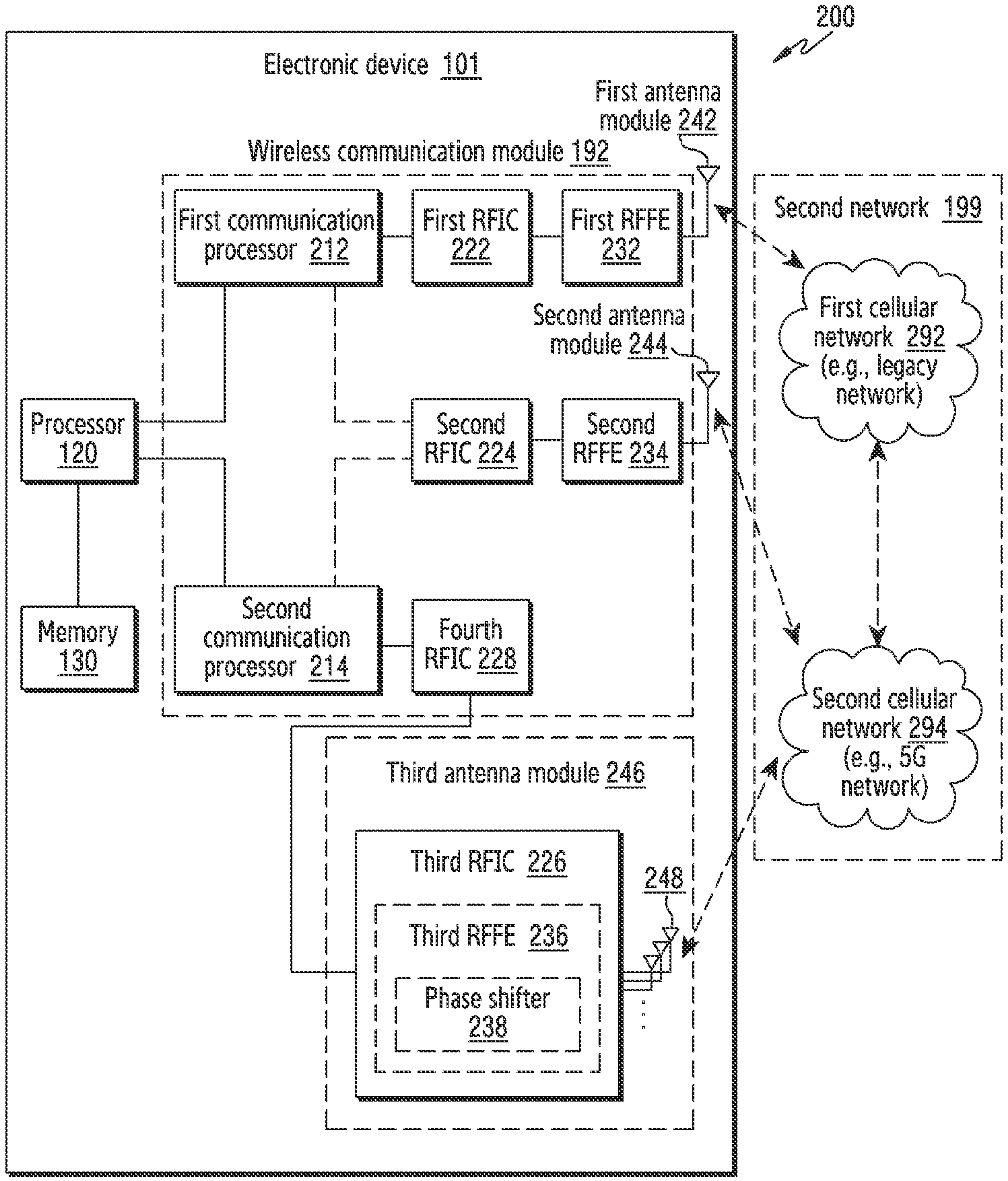
FIG. 2 is a block diagram of an electronic device in a network environment including a plurality of cellular networks according to an embodiment of the disclosure.

FIG. 2 is a block diagram 200 of an electronic device 101 in a network environment including a plurality of cellular networks according to an embodiment of the disclosure.

Referring to FIG. 2, the electronic device 101 may include a first communication processor 212, a second communication processor 214, a first Radio Frequency Integrated Circuit (RFIC) 222, a second RFIC 224, a third RFIC 226, a fourth RFIC 228, a first Radio Frequency Front End (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to an embodiment, the electronic device 101 may further include at least one component among the components of FIG. 1, and the second network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted, or may be included as part of the third RFIC 226.

The first communication processor 212 may establish a communication channel of a band to be used in wireless communication with the first cellular network 292 and may support legacy network communication through the established communication channel. According to an embodiment, the first cellular network may be a legacy network including $2^{nd}$ Generation (2G), $3^{rd}$ Generation (3G), $4^{th}$ Generation (4G), or Long Term Evolution (LTE) networks. The second communication processor 214 may establish a communication channel corresponding to a designated band (e.g., about 6 GHz to about 60 GHz) among bands to be used in wireless communication with the second cellular network 294 and may support 5G network communication through the established communication channel. According to an embodiment, the second cellular network 294 may be a 5G network defined in 3GPP. In addition, according to an embodiment, the first communication processor 212 or the second communication processor 214 may establish a communication channel corresponding to another designated band (e.g., below about 6 GHz) among bands to be used in wireless communication with the second cellular network 294. According to an embodiment, the first communication processor 212 and the second communication processor 214 may be implemented within a single chip or a single package. According to an embodiment, the first communication processor 212 or the second communication processor 214 may be formed inside a single chip or a single package, together with the processor 120, the auxiliary processor 123, or the communication module 190.

In case of transmission, the first RFIC 222 may convert a baseband signal generated by the first communication processor 212 into a Radio Frequency (RF) signal of about 700 MHz to about 3 GHz used in the first cellular network 292 (e.g., the legacy network). In case of reception, the RF signal may be acquired from the first cellular network 292 (e.g., the legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

In case of transmission, the second RFIC 224 may convert a baseband signal generated by the first communication processor 212 or the second communication processor 214 into an RF signal of a Sub6 band (e.g., below about 6 GHz) (hereinafter, a 5G Sub6 RF signal) used in the second cellular network 294 (e.g., the 5G network). In case of reception, the 5G Sub6 RF signal may be acquired from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding communication processor, i.e., either the first communication processor 212 or the second communication processor 214.

The third RFIC 226 may convert a baseband signal generated by the second communication processor 214 into an RF signal of a 5G Above6 band (e.g., about 6 GHz to about 60 GHz) (hereinafter, a 5G Above6 RF signal) to be used in wireless communication with the second cellular network 295 (e.g., the 5G network). In case of reception, the 5G Above6 RF signal may be acquired from the second cellular network 294 (e.g., the 5G network) through an antenna (e.g., the antenna 248), and may be preprocessed through a third RFFE 236. The third RFIC 226 may convert the preprocessed 5G Above6 RF signal into a baseband signal so as to be processed by the second communication processor 214. According to an embodiment, the third RFFE 236 may be formed as part of the third RFIC 226.

According to an embodiment, the electronic device 101 may include the fourth RFIC 228, either separately or as part of the third RFIC 226. In this case, the fourth RFIC 228 may convert a baseband signal generated by the second communication processor 214 into an RF signal of an intermediate frequency band (e.g., about 9 GHz to about 11 GHz) (hereinafter, an IF signal), and thereafter may transfer the IF signal to the third RFIC 226. The third RFIC 226 may convert the IF signal into a 5G Above6 RF signal. In case of reception, the 5G Above6 RF signal may be received from the second cellular network 294 (e.g., the 5G network) through an antenna (e.g., the antenna 248), and may be converted into an IF signal by means of the third RFIC 226. The fourth RFIC 228 may convert the IF signal into a baseband signal so as to be processed by the second communication processor 214.

According to an embodiment, the first RFIC 222 and the second RFIC 224 may be implemented as at least part of a single chip or a single package. According to an embodiment, the first RFFE 232 and the second RFFE 234 may be implemented as at least part of a single chip or a single package. According to an embodiment, at least one antenna module, i.e., either the first antenna module 242 or the second antenna module 244, may be omitted or may be coupled with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third antenna module 246 may be formed by disposing the third RFIC 226 on a portion (e.g., a lower face) of a second substrate (e.g., a sub PCB) separated from the first substrate and by disposing the antenna 248 on another portion (e.g., an upper face). Since the third RFIC 226 and the antenna 248 are disposed on the same substrate, a length of a transmission line between them can be decreased. Therefore, for example, a signal of a high-frequency band (e.g., about 6 GHz to about 60 GHz) used in 5G network communication can be prevented from being lost (e.g., deterioration) by the transmission line. Accordingly, the electronic device 101 can improve quality or speed of communication with the second cellular network 294 (e.g., the 5G network).

According to an embodiment, the antenna 248 may include an antenna array including a plurality of antenna elements that can be used in beamforming. In this case, the third RFIC 226 may include a plurality of phase shifters 238 corresponding to the plurality of antenna elements, for example, as part of the third RFFE 236. In case of transmission, the plurality of phase shifters 238 may convert phases of 5G Above6 RF signals to be transmitted to the outside (e.g., a base station of the 5G network) of the electronic device 101 through respective corresponding antenna elements. In case of reception, the plurality of phase shifters 238 may convert phases of 5G Above6 RF signals received from the outside through respective corresponding antenna elements into the same or substantially same phase. Accordingly, transmission or reception is possible through beamforming between the electronic device 101 and the outside.

The second cellular network 294 (e.g., the 5G network) may operate independently of the first cellular network 292 (e.g., the legacy network) (e.g., Stand-Alone (SA)), or may operate in conjunction therewith (e.g., Non-Stand Alone (NSA)). For example, the 5G network may have only an access network (e.g., a 5G Radio Access Network (RAN) or Next Generation RAN (NG RAN)), and may not have a core network (e.g., a Next Generation Core (NGC)). In this case, the electronic device 101 may access the access network of the 5G network and thereafter may access an external network (e.g., the Internet) under the control of a core network (e.g., an Evolved Packed Core (EPC)) of the legacy network. Protocol information for communication with the legacy network (e.g., LTE protocol information) or protocol information for communication with the 5G network (e.g., New Radio (NR) protocol information) may be stored in the memory 130 so as to be accessed by another component (e.g., the processor 120, the first communication processor 212, the second communication processor 214, or the like).

Figure 3A:
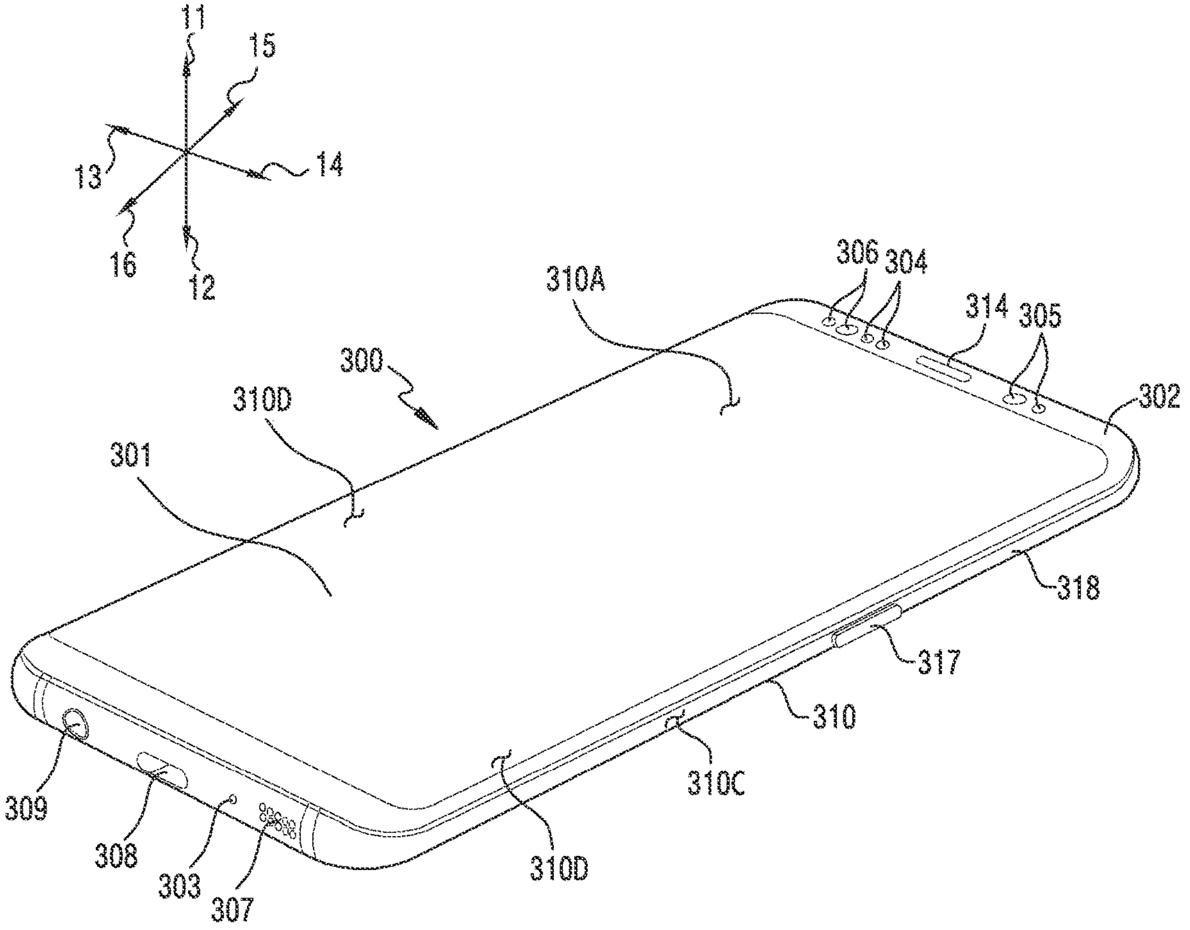
FIG. 3A is a perspective view of a mobile electronic device according to an embodiment of the disclosure.
Figure 3B:
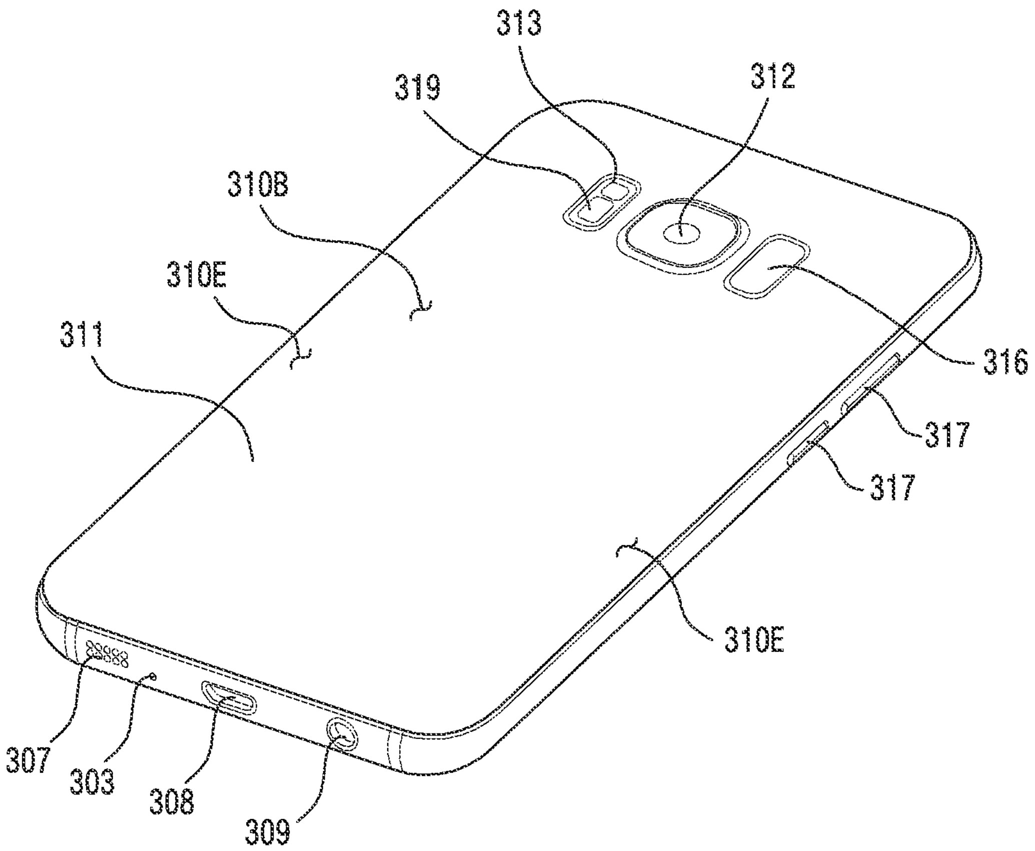
FIG. 3B is a back perspective view of a mobile electronic device according to an embodiment of the disclosure.

FIG. 3A is a perspective view of a mobile electronic device according to an embodiment of the disclosure. FIG. 3B is a back perspective view of a mobile electronic device according to an embodiment of the disclosure.

Referring to FIGS. 3A and 3B, an electronic device 300 according to an embodiment may include a housing 310 including a first face (or a front face) 310A, a second face (or a rear face) 310B, and a side face 310C surrounding a space between the first face 310A and the second face 310B. In an embodiment (not shown), the housing 310 may refer to a structure which constitutes part of the first face 310A, the second face 310B, and the side face 310C of FIG. 3A. According to an embodiment, the first face 310A may be constructed of a front plate 302 (e.g., a polymer plate, a glass plate having various coating layers, or the like) which is at least partially substantially transparent. The second face 310B may be constructed of a rear plate 311 which is substantially opaque. For example, the rear plate 311 may be constructed of coated or colored glass, ceramic, polymer, metallic materials (e.g. aluminum, stainless steel (STS), or magnesium) or a combination of at least two of these materials. The side face 310C may be constructed of a side bezel structure (or a side member) 318 bonded to the front plate 302 and the rear plate 311 and including metal and/or polymer. In an embodiment, the rear plate 311 and the side bezel structure 318 may be constructed integrally and may include the same material (e.g., a metallic material such as aluminum).

In the illustrated embodiment, the front plate 302 may include two first regions 310D seamlessly extended by being bent from the first face 310A toward the rear plate 311 at both ends of a long edge of the front plate 302. In the illustrated embodiment, the rear plate 311 may include two second regions 310E seamlessly extended by being bent from the second face 310B toward the front plate 302 at both ends of a long edge. In an embodiment, the front plate 302 (or the rear plate 311) may include only one of the first regions 310D (or the second regions 310E). In an embodiment, some of the first regions 310D or the second region 310E may not be included. In an embodiment, in a side view of the electronic device 300, the side bezel structure 318 may have a first thickness (or width) at a side in which the first regions 310D or the second regions 310E are not included, and may have a second thickness thinner than the first thickness at a side in which the first regions 310D or the second regions 310E are included.

According to an embodiment, the electronic device 300 may include at least one of a display 301, audio modules 303, 307, and 314, sensor modules 304, 316, and 319, camera modules 305, 312, and 313, a key input device 317, a light emitting element 306, or connector holes 308 and 309. In an embodiment, the electronic device 300 may omit at least one component (e.g., the key input device 317, the light emitting element 306, or the like), or other components may be additionally included.

The display 301 may be exposed through, for example, some portions of the front plate 302. In an embodiment, at least part of the display 301 may be exposed through the first face 310A and the front plate 302 constructing the first regions 310D of the side face 310C. In an embodiment, a corner of the display 301 may be constructed to be substantially identical to an adjacent outer perimeter of the front plate 302. In an embodiment (not shown), a spacing between an outer perimeter of the display 301 and the outer perimeter of the front plate 302 may be constructed to be substantially identical in order to enlarge an area to which the display 301 is exposed.

In an embodiment (not shown), a recess or opening may be constructed in part of a screen display region of the display 301, and at least one of the audio module 314, the sensor module 304, the camera module 305, or the light emitting element 306 may be included, which are aligned with the recess or the opening. In an embodiment (not shown), at least one of the audio module 314, the sensor module 304, the camera module 305, the sensor 316 (i.e., fingerprint sensor), or the light emitting element 306 may be included in a rear face of the screen display region of the display 301. In an embodiment (not shown), the display 301 may be disposed adjacent to or bonded to a touch sensing circuit, a pressure sensor capable of measuring touch strength (pressure), and/or a digitizer for detecting a magnetic-type stylus pen. In an embodiment, at least part of the sensor modules 304 and 319 and/or at least part of the key input device 317 may be disposed on the first regions 310D and/or the second regions 310E.

The audio modules 303, 307, and 314 may include a microphone hole (i.e., audio module 303) or a speaker hole (i.e., audio module 307 or 314). A microphone for acquiring external sound may be disposed inside the microphone hole (i.e., audio module 303). In an embodiment, a plurality of microphones may be disposed to detect a direction of the sound. The speaker holes (i.e., audio modules 307 and 314) may include the external speaker hole (i.e., audio module 307) and the receiver hole (i.e., audio module 314) for a call. In an embodiment, the speaker holes (i.e., audio modules 307 and 314) and the microphone hole (i.e., audio module 303) may be implemented as one hole, or a speaker (e.g., a Piezo speaker) may be included without the speaker holes (i.e., audio modules 307 and 314).

The sensor modules 304, 316, and 319 may generate an electrical signal or data value corresponding to an internal operational state of the electronic device 300 or an external environmental state. The sensor modules 304, 316, and 319 may include, for example, a first sensor module (e.g., a proximity sensor) and/or a second sensor module (e.g., a fingerprint sensor) disposed on the first face 310A of the housing 310, and/or a third sensor module (e.g., a heart rate monitoring (HRM) sensor) disposed on the second face 310B of the housing 310, and/or a sensor module (e.g., a fingerprint sensor). The fingerprint sensor may be disposed not only on the first face 310A but also on the second face 310B of the housing 310. The electronic device 300 may further include at least one of a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, an illuminance sensor, or the like.

The camera modules 305, 312, and 313 may include a first camera module disposed on the first face 310A of the electronic device 300, a second camera module disposed on the second face 310B, and/or a flash. The camera module 305 and 312 may include one or more lenses, an image sensor, and/or an image signal processor. The flash may include, for example, a light emitting diode (LED), a xenon lamp, or the like. In an embodiment, two or more lenses (e.g., infrared cameras, wide angle and telephoto lenses) and image sensors may be disposed on one face of the electronic device 300.

The key input device 317 may be disposed on the side face 310C of the housing 310. In an embodiment, the electronic device 300 may not include some or all of the aforementioned key input device 317. In that case, the key input device 317, which is not included, may be implemented on a display 301 in a different form such as a soft key or the like. In an embodiment, the key input device 317 may include the sensor module 316 disposed on the second face 310B of the housing 310.

The light emitting element 306 may be disposed on, for example, the first face 310A of the housing 310. The light emitting element 306 may provide, for example, status information of the electronic device 300 in an optical form. In an embodiment, the light emitting element 306 may provide, for example, a light source interworking with an operation of the camera module 305. The light emitting element 306 may include, for example, an LED, an IR LED, a xenon lamp, or the like.

The connector holes 308 and 309 may include the first connector hole 308 capable of accommodating a connector (e.g., a USB connector) for transmitting/receiving power and/or data of an external electronic device and/or the second connector hole (e.g., earphone jack) 309 capable of accommodating a connector for transmitting/receiving an audio signal with respect to the external electronic device.

Figure 3C:
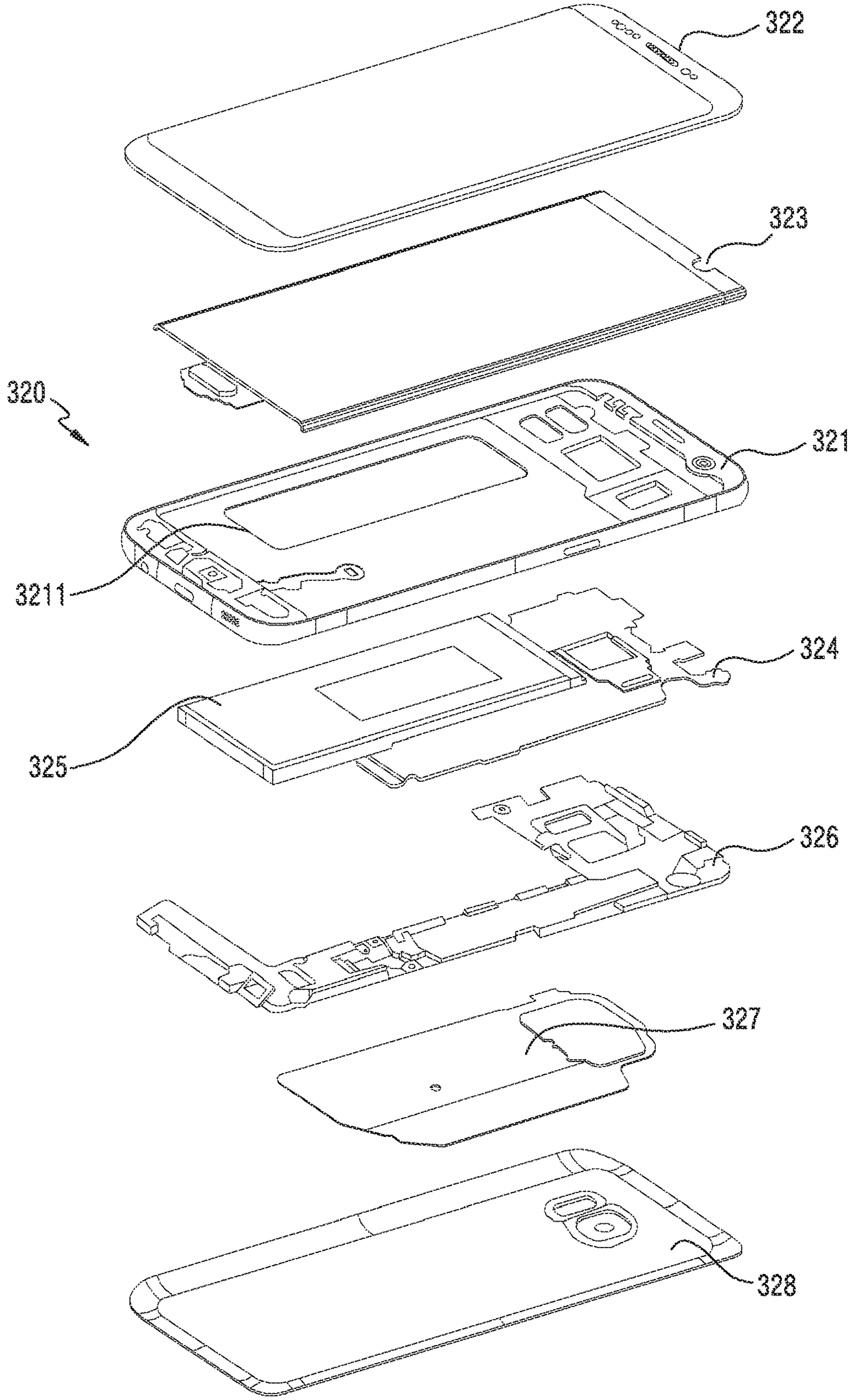
FIG. 3C is an exploded perspective view of a mobile electronic device according to an embodiment of the disclosure.

FIG. 3C is an exploded perspective view of a mobile electronic device according to an embodiment of the disclosure.

Referring to FIG. 3C, an electronic device 320 may include a side bezel structure 321, a first support member 3211 (e.g., a bracket), a front plate 322, a display 323, a PCB 324, a battery 325, a second support member 326 (e.g., a rear case), an antenna 327, and a rear plate 328. In an embodiment, the electronic device 320 may omit at least one (e.g., the first support member 3211 or the second support member 326) of these components or may additionally include other components. At least one of the components of the electronic device 320 may be the same as or similar to at least one of the components of the electronic device 300 of FIG. 3A or 3B, and redundant descriptions will be omitted hereinafter.

The first support member 3211 may be coupled with the side bezel structure 321 by being disposed inside the electronic device 320 or may be integrated with the side bezel structure 321. The first support member 3211 may be constructed of, for example, a metal material and/or a non-metal (e.g., polymer) material. The first support member 3211 may have the display 323 coupled to one face and the PCB 324 coupled to the other face. A processor, a memory, and/or an interface may be mounted on the PCB 324. The processor may include, for example, one or more of a central processing unit, an application processor, a graphic processing unit, an image signal processor, a sensor hub processor, a communication processor, or the like.

The memory may include, for example, a volatile memory or a non-volatile memory.

The interface may include, for example, an HDMI, a USB interface, an SD card interface, and/or an audio interface. The interface may electrically or physically couple, for example, the electronic device 320 with an external electronic device, and may include a USB connector, an SD card/multimedia card (MMC) connector, an audio connector, or the like.

The battery 325 may be a device for supplying power to at least one component of the electronic device 320, and may include, for example, a primary cell which is not rechargeable, a secondary cell which is rechargeable, a fuel cell, or the like. At least part of the battery 325 may be disposed, for example, to be substantially co-planar with the PCB 324. The battery 325 may be disposed inside the electronic device 320, and, according to an embodiment, may be disposed to be detachable from the electronic device 320.

The antenna 327 may be disposed between the rear plate 328 and the battery 325. The antenna 327 may include, for example, a near field communication (NFC) antenna, a wireless charging antenna, and/or a magnetic secure transmission (MST) antenna. The antenna 327 may perform short-range communication, for example, with the external electronic device, or may wirelessly transmit/receive power for charging. In an embodiment, an antenna structure may be constructed by at least part of the side bezel structure 321 and/or the first support member 3211 or a combination thereof.

Figure 4A:
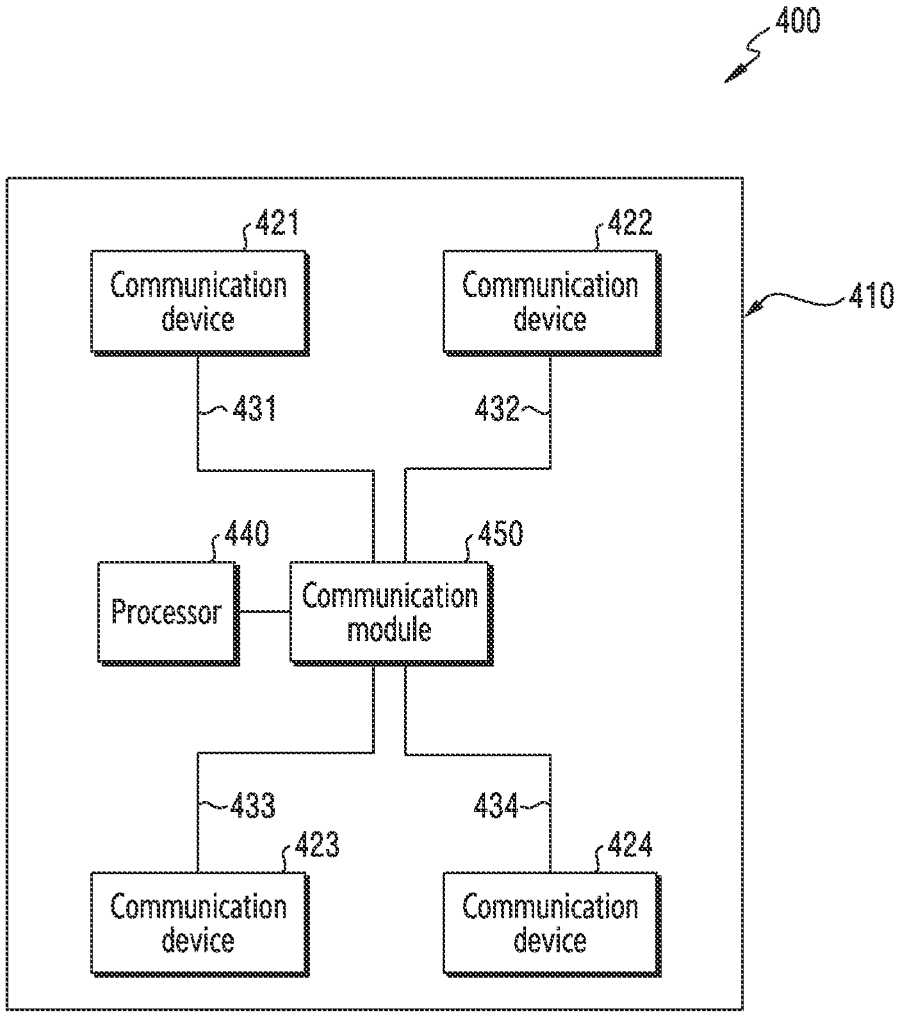
FIG. 4A illustrates an electronic device supporting $5^{th}$ Generation (5G) communication according to an embodiment of the disclosure.

FIG. 4A illustrates an electronic device supporting 5G communication according to an embodiment of the disclosure.

Referring to FIG. 4A, an electronic device 400 (e.g., the mobile electronic device 300 of FIG. 3A) according to an embodiment may include a housing 410, a processor 440, a communication module 450 (e.g., the communication module 190 of FIG. 1), a first communication device 421, a second communication device 422, a third communication device 423, a fourth communication device 424, a first conductive line 431, a second conductive line 432, a third conductive line 433, or a fourth conductive line 434.

According to an embodiment, the housing 410 may protect other components of the electronic device 400. The housing 410 may include, for example, a front plate, a back plate facing away from the front plate, and a side member (or a metal frame) attached to the back plate or integrated with the back plate and surrounding a space between the front plate and the back plate.

According to an embodiment, the electronic device 400 may include the first communication device 421, the second communication device 422, the third communication device 423, or the fourth communication device 424.

According to an embodiment, the first communication device 421, the second communication device 422, the third communication device 423, or the fourth communication device 424 may be located inside the housing 410. According to an embodiment, when viewed from above the back plate of the electronic device 400, the first communication device 421 may be disposed on a left upper end of the electronic device 400, the second communication device 422 may be disposed on a right upper end of the electronic device 400, the third communication device 423 may be disposed on a left lower end of the electronic device 400, and the fourth communication device 424 may be disposed on a right lower end of the electronic device 400.

According to an embodiment, the processor 440 may include one or more of a central processing unit, a Graphics Processing Unit (GPU), an image signal processor of a camera, a baseband processor (or a Communication Processor (CP)), or the like. According to an embodiment, the processor 440 may be implemented as a System on Chip (SoC), a System in Package (SIP), or the like.

According to an embodiment, the communication module 450 may be electrically coupled with the first communication device 421, the second communication device 422, the third communication device 423, or the fourth communication device 424 by using the first conductive line 431, the second conductive line 432, the third conductive line 433, or the fourth conductive line 434. The communication unit 450 may include, for example, a baseband processor or at least one communication circuit (e.g., IFIC or RFIC). The communication module 450 may include, for example, a baseband processor separate from the processor 440 (e.g., an Application Processor (AP)). The first conductive line 431, the second conductive line 432, the third conductive line, or the fourth conductive line 434 may include, for example, a coaxial cable or a flexible printed circuit board (FPCB).

According to an embodiment, the communication module 450 may include a first Baseband Processor (BP) (not shown) or a second BP (not shown). The electronic device 400 may further include one or more interfaces between the first BP (or the second BP) and the processor 440 to support communication between chips. The processor 440 and the first BP or the second BP may transmit or receive data by using the interface between the chips (i.e., an inter-processor communication channel).

According to an embodiment, the first BP or the second BP may provide an interface for performing communication with different entities. The first BP may support wireless communication, for example, for a first network (not shown). The second BP may support wireless communication, for example, for a second network (not shown).

According to an embodiment, the first BP or the second BP may form one module together with the processor 440. For example, the first BP or the second BP may be integrated together with the processor 440. For another example, the first BP or the second BP may be disposed inside one chip or may be formed as an independent chip. According to an embodiment, the processor 440 and at least one BP (e.g., the first BP) may be integrated inside one chip (SoC chip), and another BP (e.g., the second BP) may be formed as an independent chip.

According to an embodiment, the first network (not shown) or the second network (not shown) may correspond to the network 199 of FIG. 1. According to an embodiment, each of the first network (not shown) and the second network (not shown) may include a $4^{th}$ Generation (4G) network and a 5G network. The 4G network may support, for example, a Long Term Evolution (LTE) protocol defined in 4GPP. The 5G network may support, for example, a New Radio (NR) protocol defined in 4GPP.

Figure 4B:
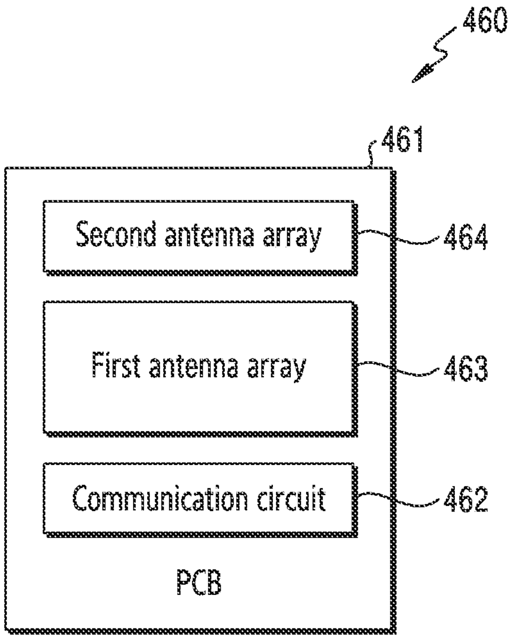
FIG. 4B is a block diagram of a communication device according to an embodiment of the disclosure.

FIG. 4B is a block diagram of a communication device according to an embodiment of the disclosure.

Referring to FIG. 4B, a communication device 460 (e.g., the first communication device 421, second communication device 422, third communication device 423, and fourth communication device 424 of FIG. 4A) according to an embodiment may include at least one of a communication circuit 462 (e.g., RFIC), a PCB 461, a first antenna array 463, or a second antenna array 464.

According to an embodiment, the communication circuit 462, the first antenna array 463, or the second antenna array 464 may be located in the PCB 461. For example, the first antenna array 463 or the second antenna array 464 may be disposed on a first face of the PCB 461, and the communication circuit 462 may be disposed on a second face of the PCB 461. The PCB 461 may include a connector (e.g., a coaxial cable connector, a Board to Board (B-to-B) connector, or the like) so as to be electrically coupled with another PCB (e.g., a PCB on which the communication module 450 of FIG. 4A is disposed) by using a transmission line (e.g., the first conductive line 431 of FIG. 4A, a coaxial cable, or the like). The PCB 461 may be coupled with a PCB having the communication module 450 disposed thereon through a coaxial cable by using, for example, the coaxial cable connector, and the coaxial cable may be used to transfer transmission and reception IF signals or RF signals. For another example, power or other control signals may be transferred through the B-to-B connector.

According to an embodiment, the first antenna array 463 or the second antenna array 464 may include a plurality of antenna elements. The antenna elements may include, for example, a patch antenna, a loop antenna, a dipole antenna, or the like. For example, the antenna element included in the first antenna array 463 may be a patch antenna to form a beam towards the back plate of the electronic device 400. For another example, the antenna included in the second antenna array 464 may be a dipole antenna or a loop antenna to form a beam towards the side member of the electronic device (e.g., the electronic device 300 of FIG. 3A).

According to an embodiment, the communication circuit 462 may support at least some bands (e.g., 24 GHZ to 30 GHZ, 37 GHz to 40 GHz, or the like) among bands in the range of 3 GHz to 100 GHz. According to an embodiment, the communication circuit 462 may up-convert or down-convert frequencies. For example, the communication circuit 462 included in the communication device 460 (e.g., the first communication device 421 of FIG. 4A) may up-convert an IF signal received through a conductive line (e.g., the first conductive line 431 of FIG. 4A) from the communication module (e.g., the communication module 450 of FIG. 4A) into an RF signal. For another example, the communication circuit 462 included in the communication device 460 (e.g., the first communication device 421 of FIG. 4A) may down-convert an RF signal (e.g., a millimeter wave signal) received through the first antenna array 463 or the second antenna array 464 into an IF signal, and may transmit the signal to the communication module by using the conductive line.

Figure 5A:
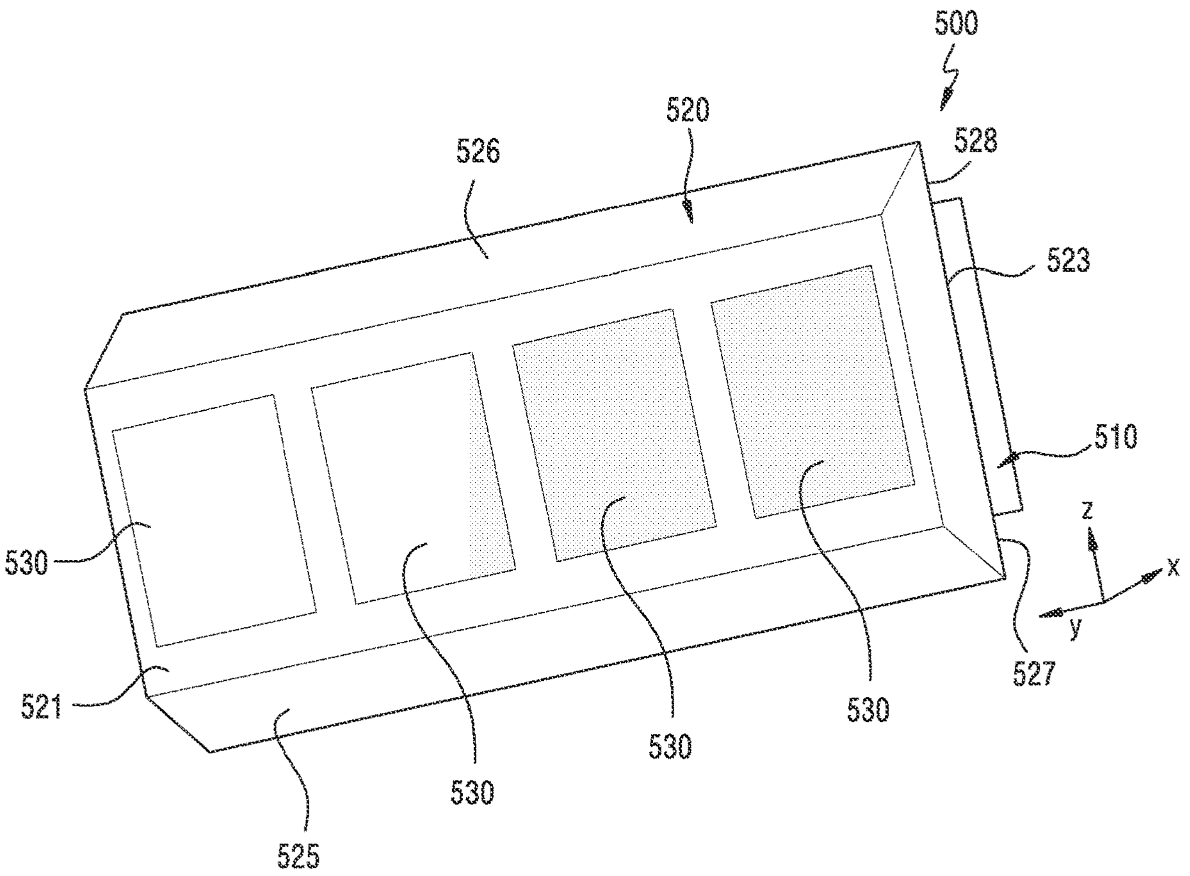
FIG. 5A is a perspective view of a communication device according to an embodiment of the disclosure.
Figure 5B:
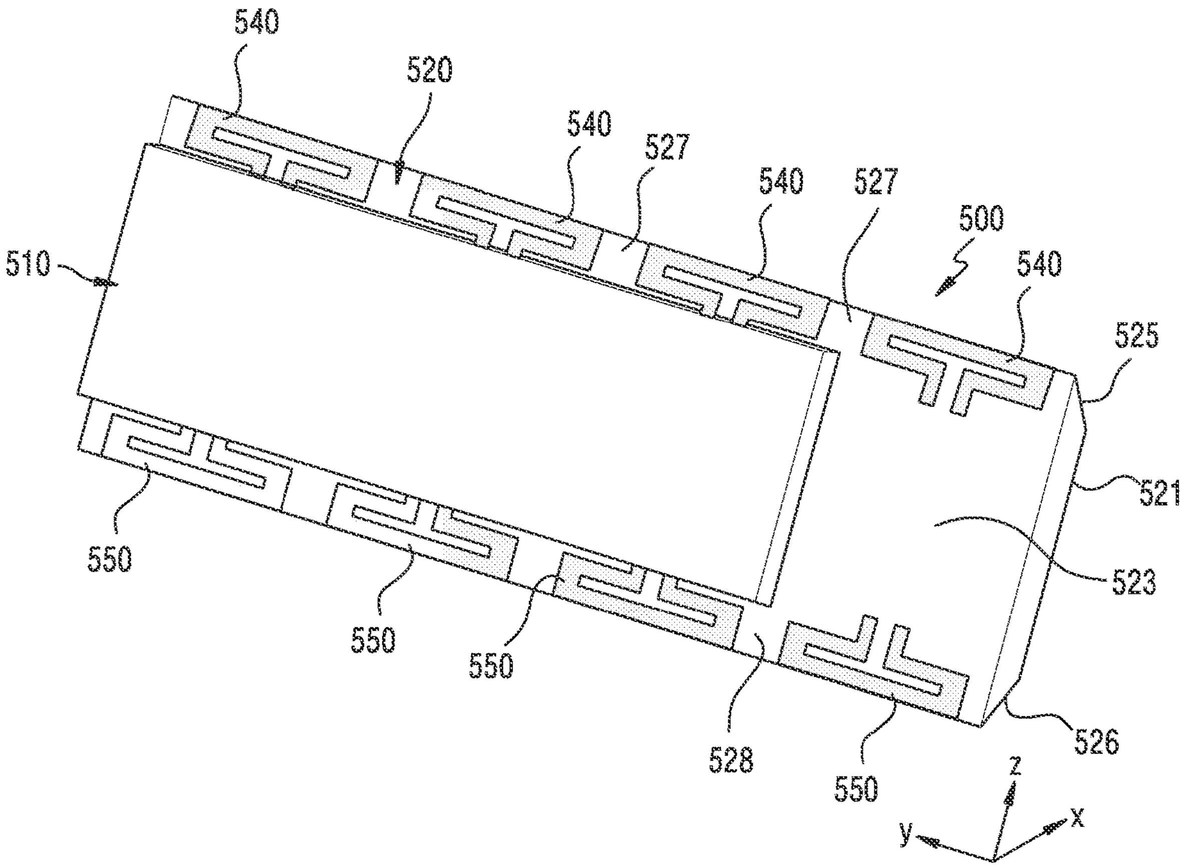
FIG. 5B is a back perspective view of a communication device according to an embodiment of the disclosure.
Figure 5C:
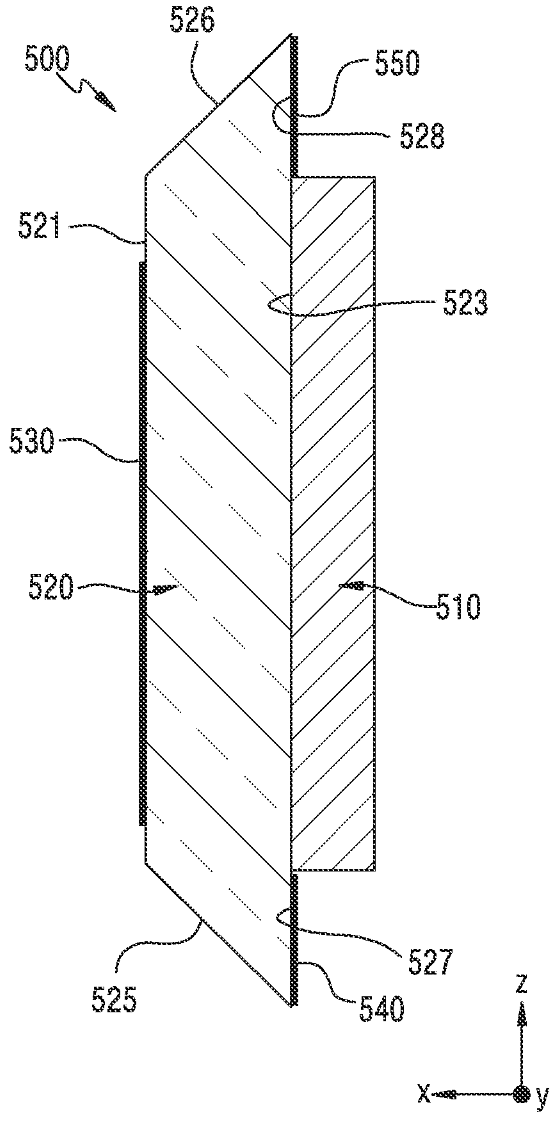
FIG. 5C is a cross-sectional view of a communication device according to an embodiment of the disclosure.

FIG. 5A is a perspective view of a communication device according to an embodiment of the disclosure. FIG. 5B is a back perspective view of a communication device according to an embodiment of the disclosure. FIG. 5C is a cross-sectional view of a communication device according to an embodiment of the disclosure. According to an embodiment, the communication device may also be termed an antenna assembly.

Referring to FIG. 5A, FIG. 5B, and FIG. 5C, a communication device 500 (e.g., the first communication device 421, the second communication device 422, the third communication device 423, or the fourth communication device 424 of FIG. 4A or the communication device 460 of FIG. 4B) according to an embodiment may include a communication circuit 510 (e.g., the communication circuit 462 of FIG. 4B) or a PCB 520 (e.g., the PCB 461 of FIG. 4B). According to an embodiment, the communication circuit 510 may be disposed on the PCB 520.

According to an embodiment, the PCB 520 may include a front face 521, a back face 523 facing away from the front face 521, and one or more side faces 525 and 526 having an inclined manner between the front face 521 and the back face 523. According to an embodiment, the communication circuit 510 may be disposed on the back face 523. According to an embodiment, an area of the front face 521 may be different from an area of the back face 523. Accordingly, the side face 525 or 526 may have an inclined manner between the front face 521 and the back face 523. For example, when the PCB 520 is viewed from a side, the PCB 520 may have a trapezoidal shape. According to an embodiment, an area of the back face 523 cannot exceed an area of the front face 521. The back face 523 may include an inner region corresponding to the front face 521 and an outer region which is a region remaining after excluding the inner region from the back face 523. For example, an angle between the front face 521 and the side face 525 or 526 may exceed 90 degrees, and an angle between the back face 523 and the side face 525 or 526 may be less than 90 degrees. According to an embodiment, an area of the back face 523 may be less than an area of the front face 521. The front face 521 may include an inner region corresponding to the back face 523 and an outer region which is a region remaining after excluding the inner region from the front face 521. For example, an angle between the front face 521 and the side face 525 or 526 may be less than 90 degrees, and an angle between the back face 523 and the side face 525 or 526 may exceed 90 degrees.

According to an embodiment, the PCB 520 may include at least one of a first antenna array 530, a second antenna array 540, or a third antenna array 550. According to an embodiment, the first antenna array 530 may include the first antenna array 463 of FIG. 4B, and the second antenna array 540 or the third antenna array 550 may include the second antenna array 464 of FIG. 4B. According to an embodiment, an antenna structure of the first antenna array 530 may be different from an antenna structure of the second antenna array 540 (or the third antenna array 550). According to an embodiment, the PCB 520 may include the first antenna array 530 and the second antenna array 540 (or the third antenna array 550). According to an embodiment, the PCB 520 may include the second antenna array 540 or the third antenna array 550.

According to an embodiment, the first antenna array 530 may be formed on at least one of the front face 521 or the back face 523. The first antenna array 530 may include one or more antennas. According to an embodiment, the term "first antennas" may refer to antennas of the first antenna array 530. For example, the first antennas may be patch antennas. The first antennas may be arranged as at least one row and at least one column. The first antennas may be disposed by being spaced by a designated interval from each other. According to an embodiment, the first antenna array 530 may be electrically coupled with the communication circuit 510. For example, the first antennas may be individually coupled with the communication circuit 510. For example, the first antennas may be electrically coupled with the communication circuit 510 through a conductive via which is extended from an inner portion of the PCB 520. For another example, the first antennas may be electrically coupled with the communication circuit 510 through coupling.

According to an embodiment, the second antenna array 540 may be formed on a region 527 corresponding to the side face 525. According to an embodiment, the region 527 corresponding to the side face 525 may include at least part of an outer region of the back face 523. According to an embodiment, the region 527 corresponding to the side face 525 may include at least part of the outer region of the front face 521. The second antenna array 540 may include one or more antennas. According to an embodiment, the term "second antennas" may refer to antennas of the second antenna array 540. For example, the second antennas may include at least one of a patch antenna, a loop antenna, a dipole antenna, or the like. The second antennas may be arranged as at least one row and at least one column. The second antennas may be disposed by being spaced by a designated interval from each other. According to an embodiment, the second antenna array 540 may be electrically coupled with the communication circuit 510. For example, the second antennas may be individually coupled with the communication circuit 510. For example, the second antennas may be electrically coupled with the communication circuit 510 through a conductive via which is extended from an inner portion of the PCB 520. For another example, the second antennas may be electrically coupled with the communication circuit 510 through coupling.

According to an embodiment, the third antenna array 550 may be formed on a region 528 corresponding to the side face 526. According to an embodiment, the region 528 corresponding to the side face 526 may include at least part of an outer region of the back face 523. According to an embodiment, the region 528 corresponding to the side face 526 may include at least part of the outer region of the front face 521. The third antenna array 550 may include one or more antennas. According to an embodiment, the term "third antennas" may refer to antennas of the third antenna array 550. For example, the third antennas may include at least one of a patch antenna, a loop antenna, a dipole antenna, or the like. The third antennas may be arranged as at least one row and at least one column. The third antennas may be disposed by being spaced by a designated interval from each other. According to an embodiment, the third antenna array 550 may be electrically coupled with the communication circuit 510. For example, the third antennas may be individually coupled with the communication circuit 510. For example, the third antennas may be electrically coupled with the communication circuit 510 through a conductive via which is extended from an inner portion of the PCB 520. For another example, the third antennas may be electrically coupled with the communication circuit 510 through coupling.

Figure 6A:
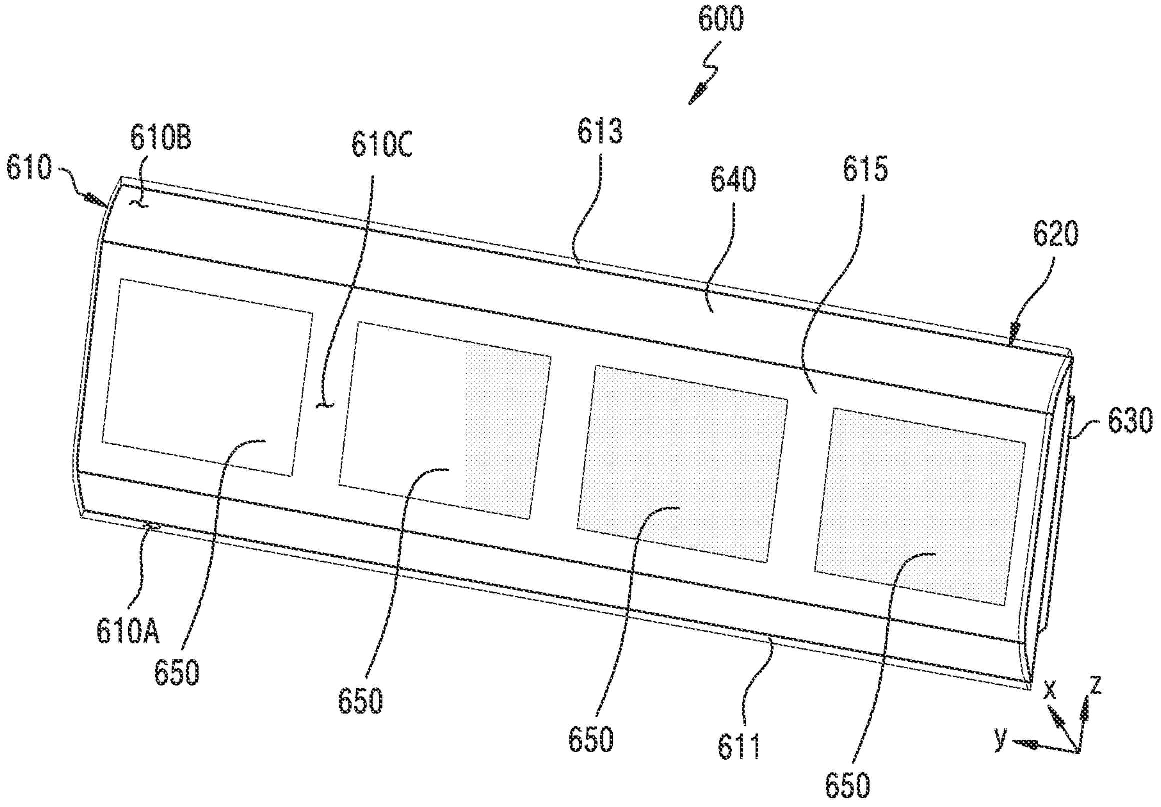
FIG. 6A is a perspective view illustrating an arrangement of a communication device in an electronic device according to an embodiment of the disclosure.
Figure 6B:
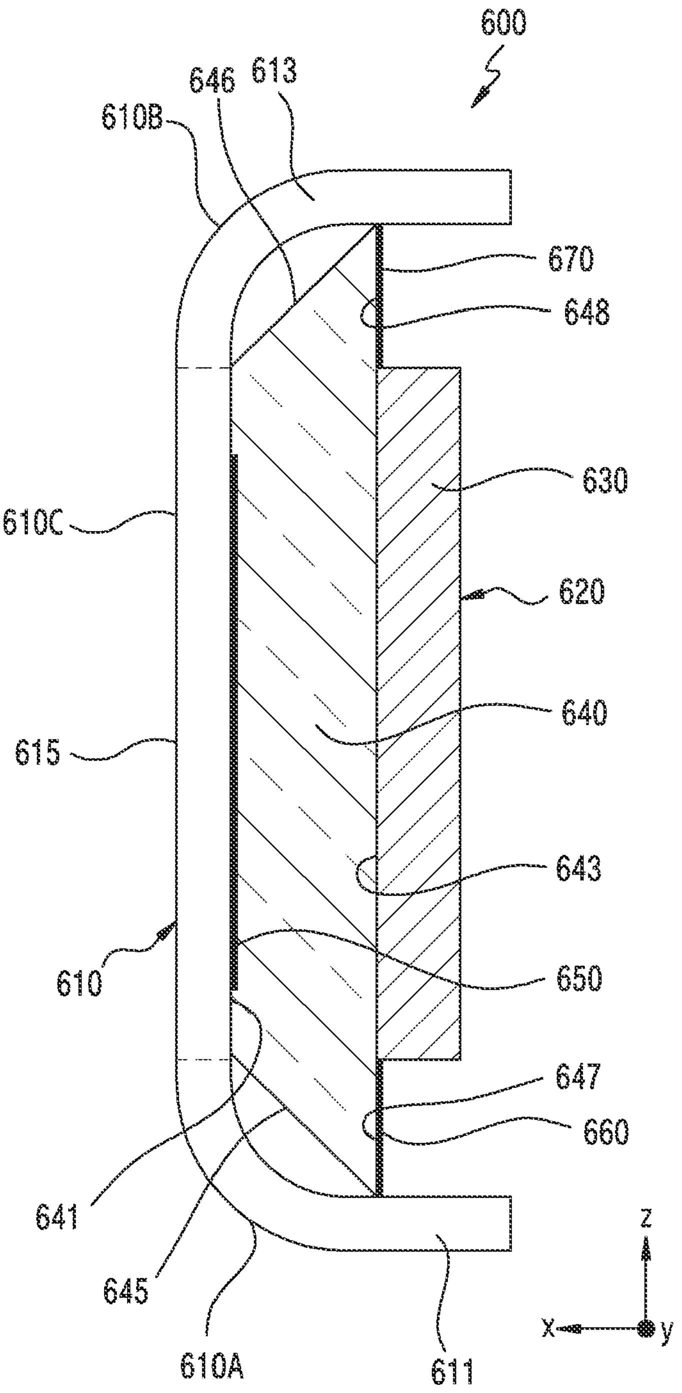
FIG. 6B is a cross-sectional view illustrating an arrangement of a communication device in an electronic device according to an embodiment of the disclosure.

FIG. 6A is a perspective view illustrating an arrangement of a communication device in an electronic device according to an embodiment of the disclosure. FIG. 6B is a cross-sectional view illustrating an arrangement of a communication device in an electronic device according to an embodiment of the disclosure.

Referring to FIG. 6A and FIG. 6B, an electronic device 600 according to an embodiment may include a housing 610 (e.g., the housing 310 of FIG. 3A) and a communication device 620.

According to an embodiment, the housing 610 may include a first face (or a front face) 610A (e.g., the first face 310A of FIG. 3A), a second face (or a back face) 610B (e.g., the second face 310B of FIG. 3B), and a third face (or a side face) 610C (e.g., the side face 310C of FIG. 3A). The first face 610A may include a front plate 611 (e.g., the front plate 302 of FIG. 3A or the front plate 322 of FIG. 3C), the second face 610B may include a back plate 613 (e.g., the back plate 311 of FIG. 3B or the back plate 328 of FIG. 3C), and the third face 610C may include a side bezel structure (or a side member) 615 (e.g., the side bezel structure 318 of FIG. 3A or the side bezel structure 321 of FIG. 3C). For example, the front plate 611, the back plate 613, and the side bezel structure 615 may be integrated. For another example, the front plate 611 and the side bezel structure 615 may be integrated and may be coupled with the back plate 613. For another example, the back plate 613 and the side bezel structure 615 may be integrated and may be coupled with the front plate 611. For another example, the front plate 611, the back plate 613, and the size bezel structure 615 may be coupled by being individually formed. According to an embodiment, a signal transmitted/received in the communication device 620 may pass through at least part of the housing 610. For this, at least part of the housing 610 may include, for example, coated or colored glass, ceramic, and polymer, or by combining at least two of these materials.

According to an embodiment, the communication device 620 may include a communication circuit 630 (e.g., the communication circuit 510 of FIG. 5A, FIG. 5B, and FIG. 5C) and a PCB 640 (e.g., the PCB 520 of FIG. 5A, FIG. 5B, and FIG. 5C). The PCB 640 may include a front face 641 (e.g., the front face 521 of FIG. 5A, FIG. 5B, and FIG. 5C), a back face 643 (e.g., the back face 523 of FIG. 5A, FIG. 5B, and FIG. 5C) on which the communication circuit 630 is disposed, and one or more side faces 645 and 646 (e.g., the side faces 525 and 526 of FIG. 5A, FIG. 5B, or FIG. 5C) having an inclined manner between the front face 641 and the back face 643. According to an embodiment, the PCB 640 may include a first antenna array 650 (e.g., the first antenna array 530 of FIG. 5A) and at least one of a second antenna array 660 (e.g., the second antenna array 540 of FIG. 5B) or a third antenna array 670 (e.g., the third antenna array 550 of FIG. 5B). The first antenna array 650 may be formed on the front face 641. The second antenna array 660 may be formed on a region 647 (e.g., the region 527 of FIG. 5A, 5B, or 5C) corresponding to the side face 645. The third antenna array 670 may be formed on a region 648 (e.g., the region 528 of FIG. 5A, 5B, or 5C) corresponding to the side face 646. According to an embodiment, the region 647 corresponding to the side face 645 and/or the region 648 corresponding to the side face 646 may include at least part of an outer region of the back face 643.

According to an embodiment, the communication device 620 may be disposed inside the electronic device 600, and thus may be disposed adjacent to at least part of the housing 610. The front face 641 of the PCB 640 may be disposed to face the side bezel structure 615 in at least part of the housing 610, and the side face 645 of the PCB 640 may be disposed to face at least one of the front plate 611 or the back plate 613 in at least part of the housing 610. According to an embodiment, the communication circuit 630 may transmit/receive at least one signal through at least one of the first antenna array 650, the second antenna array 660, or the third antenna array 670. For example, the signal transmitted/received through the first antenna array 650 may pass through the side bezel structure 615 in at least part of the housing 610, and a signal transmitted/received through the second antenna array 660 and/or the third antenna array 670 may pass through at least one of the front plate 611 or the back plate 613 in at least part of the housing 610.

Figure 7A:
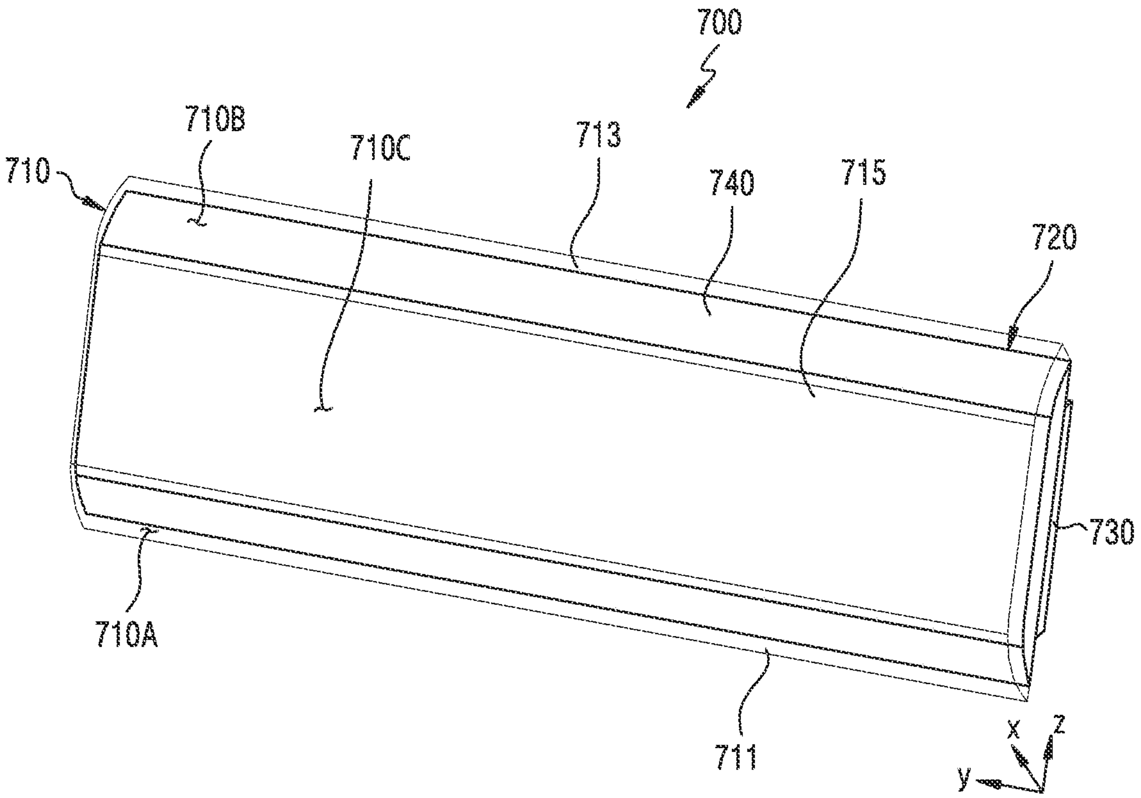
FIG. 7A is a perspective view illustrating an arrangement of a communication device in an electronic device according to an embodiment of the disclosure.
Figure 7B:
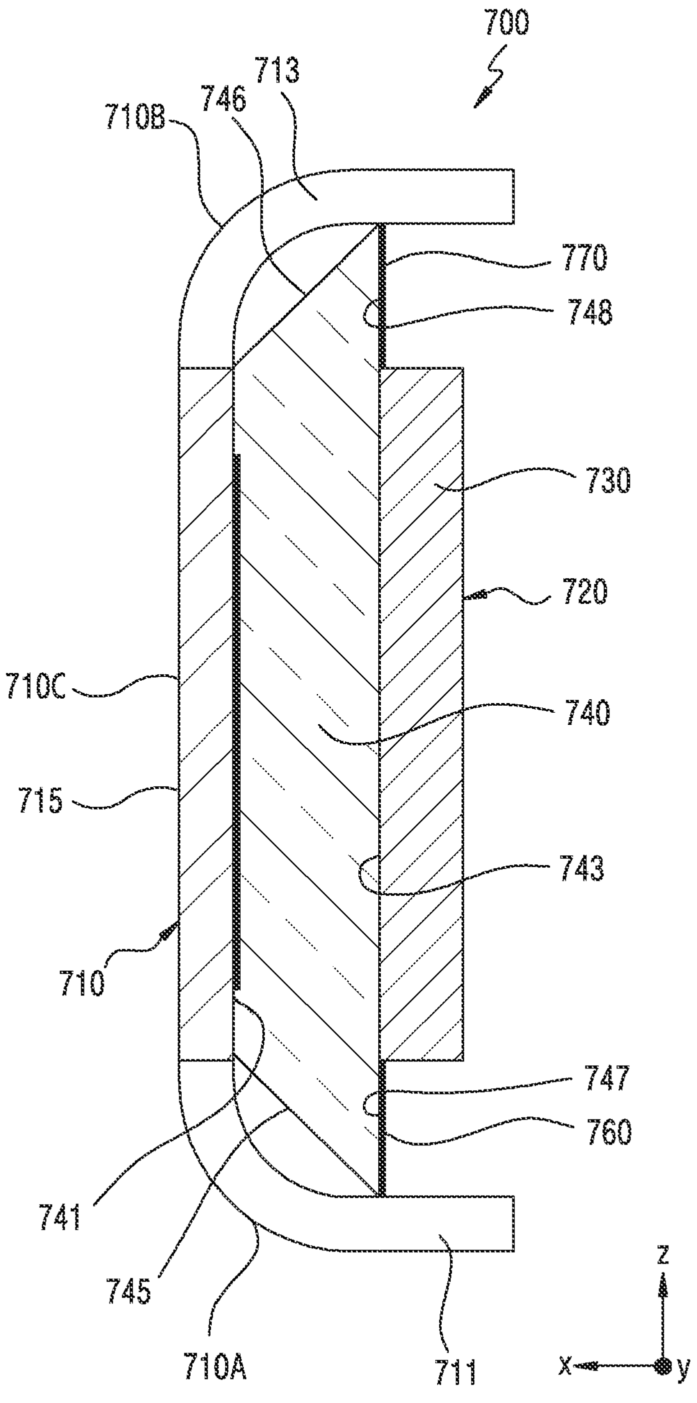
FIG. 7B is a cross-sectional view illustrating an arrangement of a communication device in an electronic device according to an embodiment of the disclosure.

FIG. 7A is a perspective view illustrating an arrangement of a communication device in an electronic device according to an embodiment of the disclosure. FIG. 7B is a cross-sectional view illustrating an arrangement of a communication device in an electronic device according to an embodiment of the disclosure.

Referring to FIG. 7A and FIG. 7B, an electronic device 700 according to an embodiment may include a housing 710 (e.g., the housing 310 of FIG. 3A) and a communication device 720.

According to an embodiment, the housing 710 may include a first face (or a front face) 710A (e.g., the first face 310A of FIG. 3A), a second face (or a back face) 710B (e.g., the second face 310B of FIG. 3B), and a third face (or a side face) 710C (e.g., the side face 310C of FIG. 3A). The first face 710A may include a front plate 711 (e.g., the front plate 302 of FIG. 3A or the front plate 322 of FIG. 3C), the second face 710B may include a back plate 713 (e.g., the back plate 311 of FIG. 3B or the back plate 328 of FIG. 3C), and the third face 710C may include a side bezel structure (or a side member) 715 (e.g., the side bezel structure 318 of FIG. 3A or the side bezel structure 321 of FIG. 3C). According to an embodiment, a signal transmitted/received in the communication device 720 may pass through at least part of the housing 710. For this, in at least part of the housing 710, the front plate 711 and the back plate 713 may include, for example, coated or colored glass, ceramic, and polymer, or by combining at least two of these materials. According to an embodiment, in at least part of the housing 710, the side bezel structure 715 may include metal (e.g., aluminum, stainless steel (STS), or magnesium).

According to an embodiment, the communication device 720 may include a communication circuit 730 (e.g., the communication circuit 510 of FIG. 5A, FIG. 5B, and FIG. 5C) and a PCB 740 (e.g., the PCB 520 of FIG. 5A, FIG. 5B, and FIG. 5C). The PCB 740 may include a front face 741 (e.g., the front face 521 of FIG. 5A, FIG. 5B, and FIG. 5C), a back face 743 (e.g., the back face 523 of FIG. 5A, FIG. 5B, and FIG. 5C) on which the communication circuit 730 is disposed, and one or more side faces 745 and 746 (e.g., the side faces 525 and 526 of FIG. 5A, FIG. 5B, or FIG. 5C) having an inclined manner between the front face 741 and the back face 743. According to an embodiment, the PCB 740 may include a second antenna array 760 (e.g., the second antenna array 540 of FIG. 5B) and/or a third antenna array 770 (e.g., the third antenna array 550 of FIG. 5B). The second antenna array 760 may be formed on a region 747 (e.g., the region 527 of FIG. 5A, 5B, or 5C) corresponding to the side face 745. The third antenna array 770 may be formed on a region 748 (e.g., the region 528 of FIG. 5A, 5B, or 5C) corresponding to the side face 746. According to an embodiment, the region 747 corresponding to the side face 745 and/or the region 748 corresponding to the side face 746 may include at least part of an outer region of the back face 743.

According to an embodiment, the communication device 720 may be disposed inside the electronic device 700, and thus may be disposed adjacent to at least part of the housing 710. The front face 741 of the PCB 740 may be disposed to face the side bezel structure 715 in at least part of the housing 710, and the side face 745 of the PCB 740 may be disposed to face at least one of the front plate 711 or the back plate 713 in at least part of the housing 710. According to an embodiment, the communication circuit 730 may transmit/receive at least one signal through the second antenna array 760 and/or the third antenna array 770. The signal transmitted/received through the second antenna array 760 and/or the third antenna array 770 may pass through at least one of the front plate 711 or the back plate 713 in at least part of the housing 710.

Figure 8:
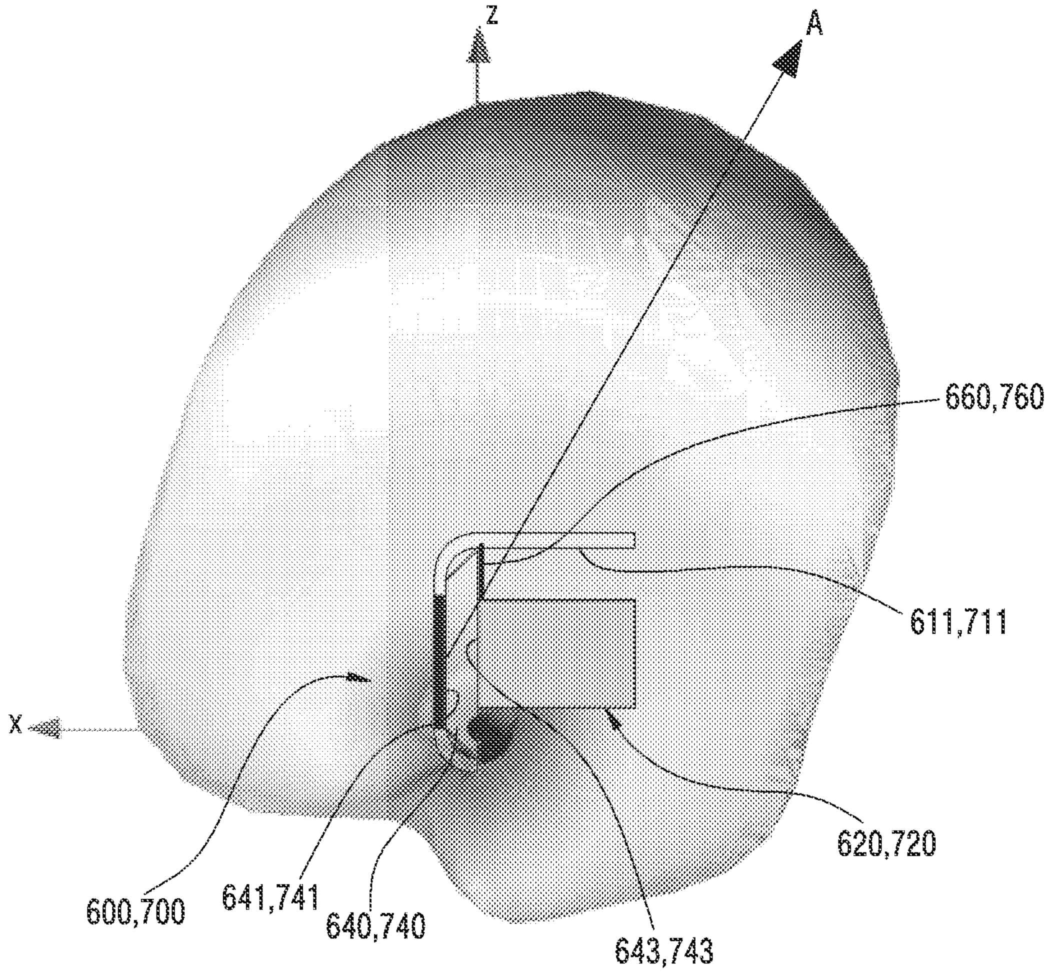
FIG. 8 illustrates a radiation pattern of a second antenna array in a communication device of an electronic device according to an embodiment of the disclosure.

FIG. 8 illustrates a radiation pattern of a second antenna array in a communication device of an electronic device according to an embodiment of the disclosure.

Referring to FIG. 8, the communication devices 620 and 720 of the electronic devices 600 and 700 according to an embodiment may transmit/receive signals through beams formed by the second antenna arrays 660 and 760 (or the third antenna arrays 670 and 770). A direction A of the beams formed by the second antenna arrays 660 and 760 may be inclined between a first axis (e.g., an X-axis) which passes through the front faces 641 and 741 and the back faces 643 and 743 and a second axis (e.g., a Y-axis) and third axis (e.g., a Z-axis) perpendicular to the first axis. For example, the direction A of the beams formed by the second antenna arrays 660 and 760 may pass through the back plates 613 and 713.

Figure 9A:
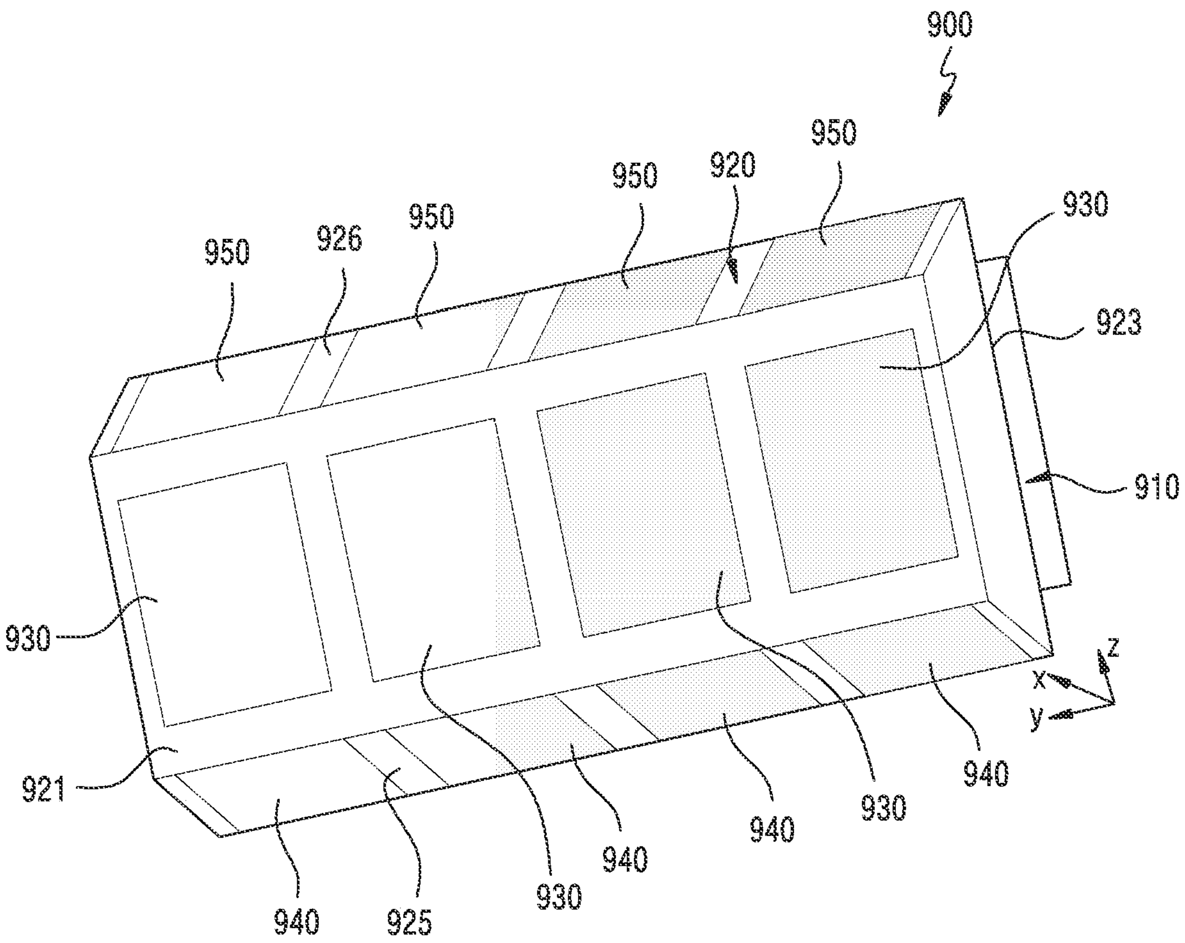
FIG. 9A is a perspective view of a communication device according to an embodiment of the disclosure.
Figure 9B:
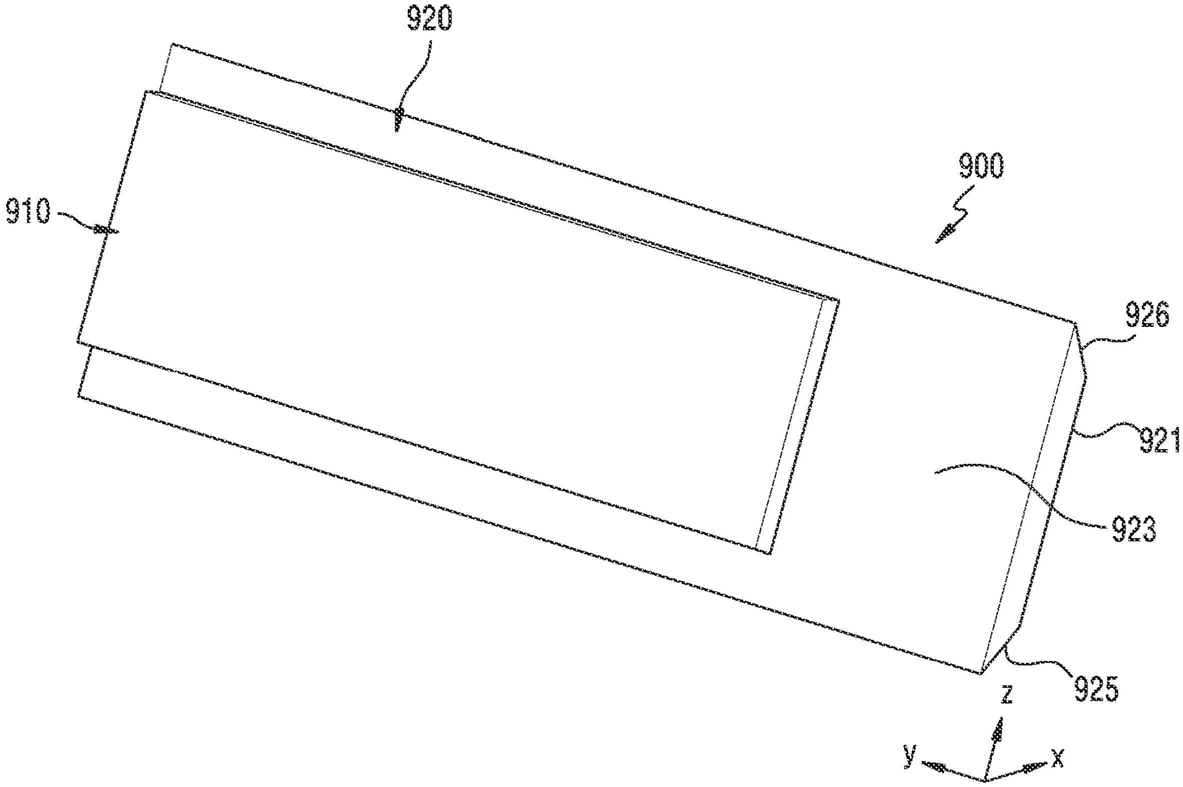
FIG. 9B is a back perspective view of a communication device according to an embodiment of the disclosure.
Figure 9C:
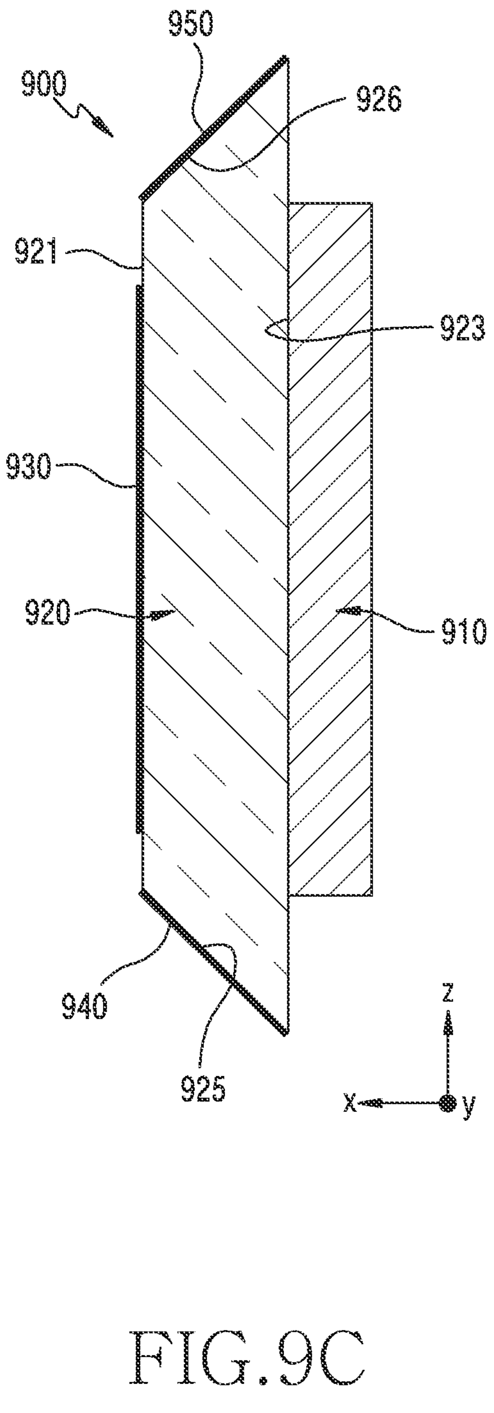
FIG. 9C is a cross-sectional view of a communication device according to an embodiment of the disclosure.

FIG. 9A is a perspective view of a communication device according to an embodiment of the disclosure. FIG. 9B is a back perspective view of a communication device according to an embodiment of the disclosure. FIG. 9C is a cross-sectional view of a communication device according to an embodiment of the disclosure. According to an embodiment, at least one component of the communication device illustrated in FIG. 9A, FIG. 9B, and FIG. 9C may be identical or similar to at least one component of the communication device 500 of FIG. 5A, FIG. 5B, and FIG. 5C, and redundant descriptions will be omitted.

Referring to FIG. 9A, FIG. 9B, and FIG. 9C, a communication device 900 according to an embodiment may include a communication circuit 910 (e.g., the communication circuit 462 of FIG. 4B) or a PCB 920 (e.g., the PCB 461 of FIG. 4B). According to an embodiment, the communication circuit 910 may be disposed on the PCB 920.

According to an embodiment, the PCB 920 may include a front face 921, a back face 923 facing away from the front face 921, and one or more side faces 925 and 926 having an inclined manner between the front face 921 and the back face 923. According to an embodiment, the communication circuit 910 may be disposed on the back face 923. According to an embodiment, an area of the front face 921 may be different from an area of the back face 923. Accordingly, the one or more side faces 925 and 926 may have an inclined manner between the front face 921 and the back face 923.

According to an embodiment, the PCB 920 may include at least one of a first antenna array 930, a second antenna array 940, or a third antenna array 950. According to an embodiment, the first antenna array 930 may include the first antenna array 463 of FIG. 4B, and the second antenna array 940 or the third antenna array 950 may include the second antenna array 464 of FIG. 4B. For example, an antenna structure of the first antenna array 930 may be different from an antenna structure of the second antenna array 940 (or the third antenna array 950). According to an embodiment, the PCB 920 may include the first antenna array 930 and the second antenna array 940 (or the third antenna array 950). According to an embodiment, the PCB 920 may include the second antenna array 940 or the third antenna array 950.

According to an embodiment, the first antenna array 930 may be formed on at least one of the front face 921 or the back face 923. The first antenna array 930 may include one or more first antennas. For example, the first antennas may be patch antennas. According to an embodiment, the first antenna array 930 may be electrically coupled with the communication circuit 910. For example, the first antennas may be individually coupled with the communication circuit 910.

According to an embodiment, the second antenna array 940 may be formed on the side face 925. According to an embodiment (not shown), the second antenna array 940 may extend from the side face 925 to an outer region of the back face 923. According to an embodiment (not shown), the second antenna array 940 may extend from the side face 925 to an outer region of the front face 921. The second antenna array 940 may include one or more antennas. For example, the second antennas may include at least one of a patch antenna, a loop antenna, a dipole antenna, or the like. According to an embodiment, the second antenna array 1240 may be electrically coupled with the communication circuit 1210. For example, the second antennas may be individually coupled with the communication circuit 1210.

According to an embodiment, the third antenna array 950 may be formed on the side face 926. According to an embodiment (not shown), the third antenna array 950 may extend from the side face 926 to an outer region of the back face 923. According to an embodiment (not shown), the third antenna array 950 may extend from the side face 926 to an outer region of the front face 921. The third antenna array 950 may include one or more third antennas. For example, the third antennas may include at least one of a patch antenna, a loop antenna, a dipole antenna, or the like. According to an embodiment, the third antenna array 950 may be electrically coupled with the communication circuit 910. For example, the third antennas may be individually coupled with the communication circuit 910.

Figure 10A:
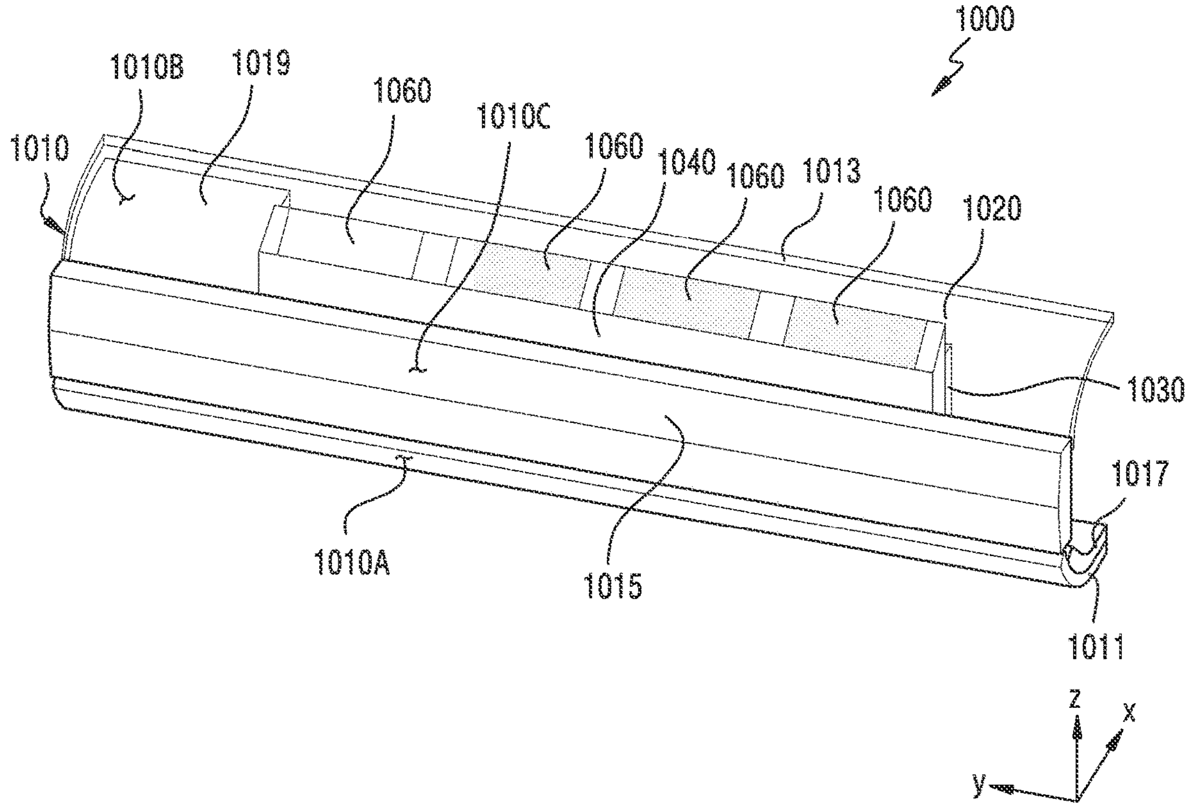
FIG. 10A is a perspective view illustrating an arrangement of a communication device in an electronic device according to an embodiment of the disclosure.
Figure 10B:
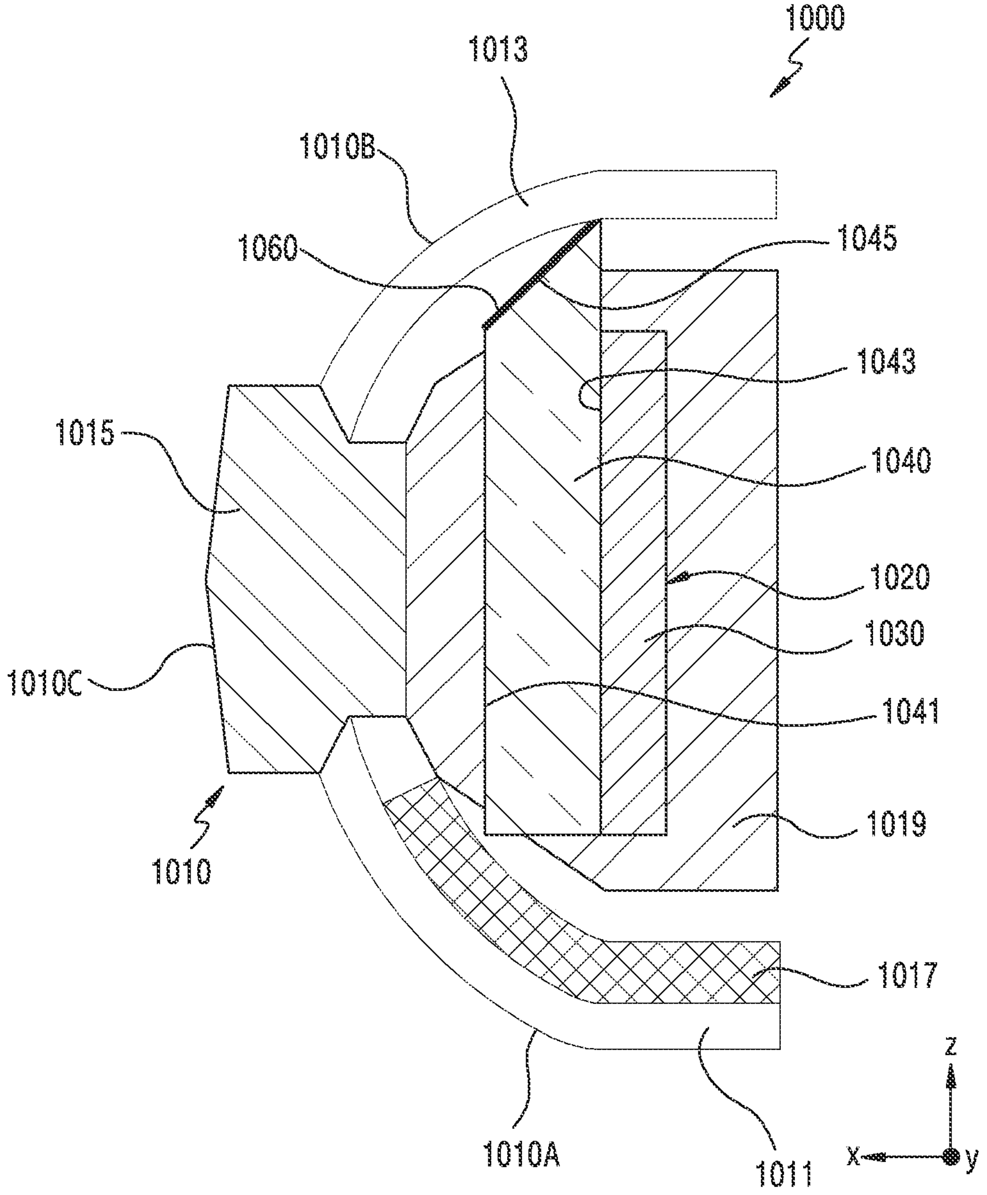
FIG. 10B is a cross-sectional view illustrating an arrangement of a communication device in an electronic device according to an embodiment of the disclosure.

FIG. 10A is a perspective view illustrating an arrangement of a communication device in an electronic device according to an embodiment of the disclosure. FIG. 10B is a cross-sectional view illustrating an arrangement of a communication device in an electronic device according to an embodiment of the disclosure.

Referring to FIG. 10A and FIG. 10B, an electronic device 1000 according to an embodiment may include a housing 1010 (e.g., the housing 310 of FIG. 3A), a display 1017 (e.g., the display 301 of FIG. 3A or the display 323 of FIG. 3C), a first support member 1019 (e.g., the support member 321 of FIG. 3C), and a communication device 1020.

According to an embodiment, the housing 1010 may include a first face (or a front face) 1010A (e.g., the first face 310A of FIG. 3A), a second face (or a back face) 1010B (e.g., the second face 310B of FIG. 3B), and a third face (or a side face) 1010C (e.g., the side face 310C of FIG. 3A). The first face 1010A may include a front plate 1011 (e.g., the front plate 302 of FIG. 3A or the front plate 322 of FIG. 3C), the second face 1010B may include a back plate 1013 (e.g., the back plate 311 of FIG. 3B or the back plate 328 of FIG. 3C), and the third face 1010C may include a side bezel structure (or a side member) 1015 (e.g., the side bezel structure 318 of FIG. 3A or the side bezel structure 321 of FIG. 3C). According to an embodiment, a signal transmitted/received in the communication device 1020 may pass through at least part of the housing 1010. For this, in at least part of the housing 1010, the front plate 1011 and the back plate 1013 may include, for example, coated or colored glass, ceramic, and polymer, or by combining at least two of these materials. According to an embodiment, in at least part of the housing 1010, the side bezel structure 1015 may include metal (e.g., aluminum, stainless steel (STS), or magnesium).

According to an embodiment, the display 1017 may be disposed inside the electronic device 1000, and thus may be disposed adjacent to the first face 1010A of the housing 1010. The display 1017 may be coupled with the front plate 1011. For example, the display 1017 may be coupled between the front plate 1011 and the first support member 1019.

According to an embodiment, the first support member 1019 may be disposed inside the electronic device 1000, and thus may be disposed between the front plate 1011 and back plate 1013 of the housing 1010. The first support member 1019 may be coupled with the side bezel structure 1015 or may be integrated with the side bezel structure 1015.

According to an embodiment, the communication device 1020 may include a communication circuit 1030 (e.g., the communication circuit 510 of FIG. 5A, FIG. 5B, and FIG. 5C) and a PCB 1040 (e.g., the PCB 520 of FIG. 5A, FIG. 5B, and FIG. 5C). The PCB 1040 may include a front face 1041 (e.g., the front face 521 of FIG. 5A, FIG. 5B, and FIG. 5C), a back face 1043 (e.g., the back face 523 of FIG. 5A, FIG. 5B, and FIG. 5C) on which the communication circuit 1030 is disposed, and at least one side face 1045 (e.g., the side face 525 of FIG. 5A, FIG. 5B, and FIG. 5C) having an inclined manner between the front face 1041 and the back face 1043. According to an embodiment, the PCB 1040 may include a second antenna array 1060 (e.g., the second antenna array 540 of FIG. 5A, FIG. 5B, and FIG. 5C). The second antenna array 1060 may be formed on the side face 1045.

According to an embodiment, the communication device 1020 may be disposed inside the electronic device 1000, and thus may be disposed adjacent to at least part of the housing 1010. For example, the communication device 1020 may be coupled with the first support member 1019. The front face 1041 of the PCB 1040 may be disposed to face the side bezel structure 1015 in at least part of the housing 1010, and the side face 1045 of the PCB 1040 may be disposed to face at least the back plate 1013 in at least part of the housing 1010. According to an embodiment, the communication circuit 1030 may transmit/receive at least one signal through the second antenna array 1060. The signal transmitted/received through the second antenna array 1060 may pass through the back plate 1013 in at least part of the housing 1010.

Figure 11A:
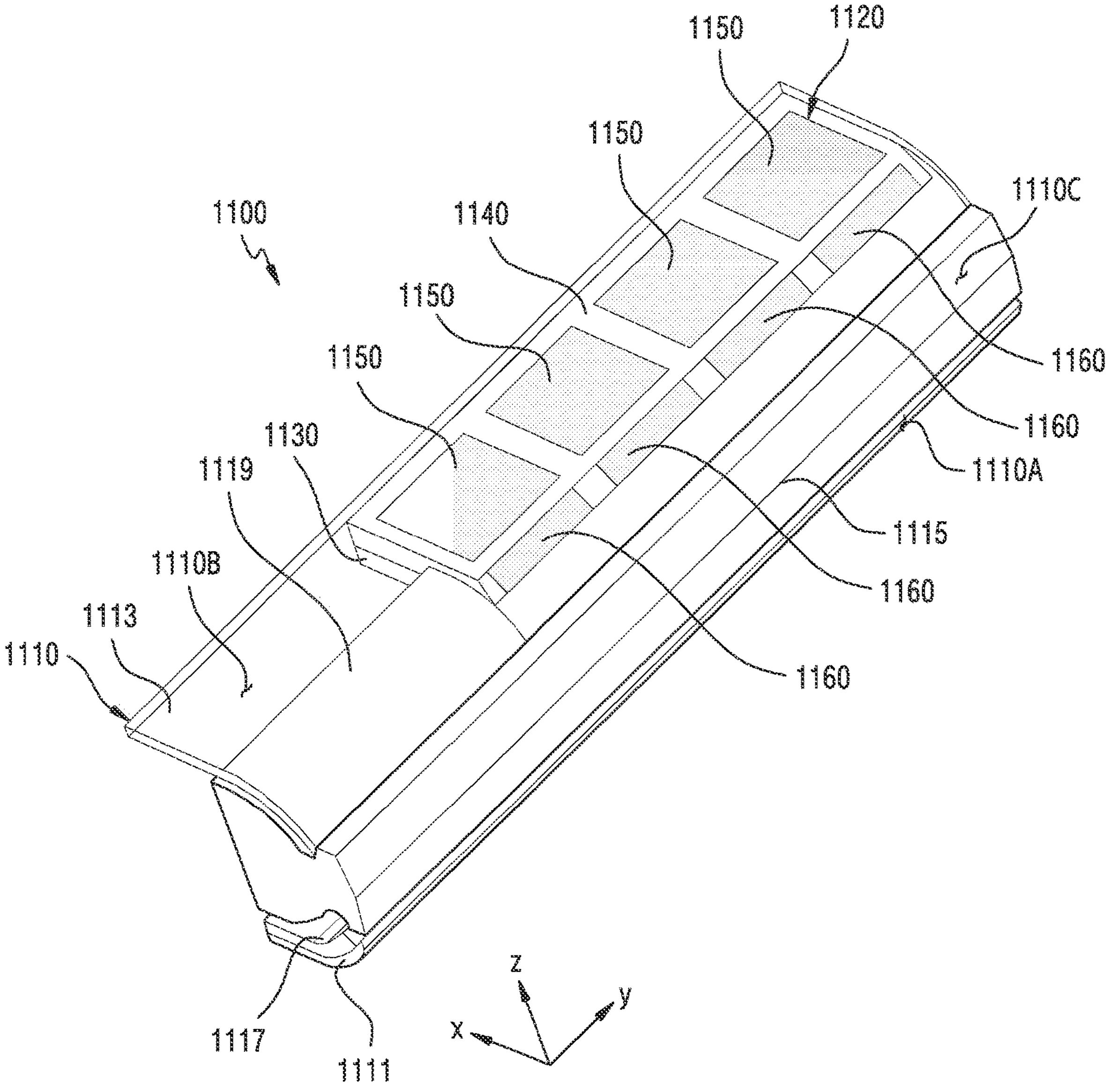
FIG. 11A is a perspective view illustrating an arrangement of a communication device in an electronic device according to an embodiment of the disclosure.
Figure 11B:
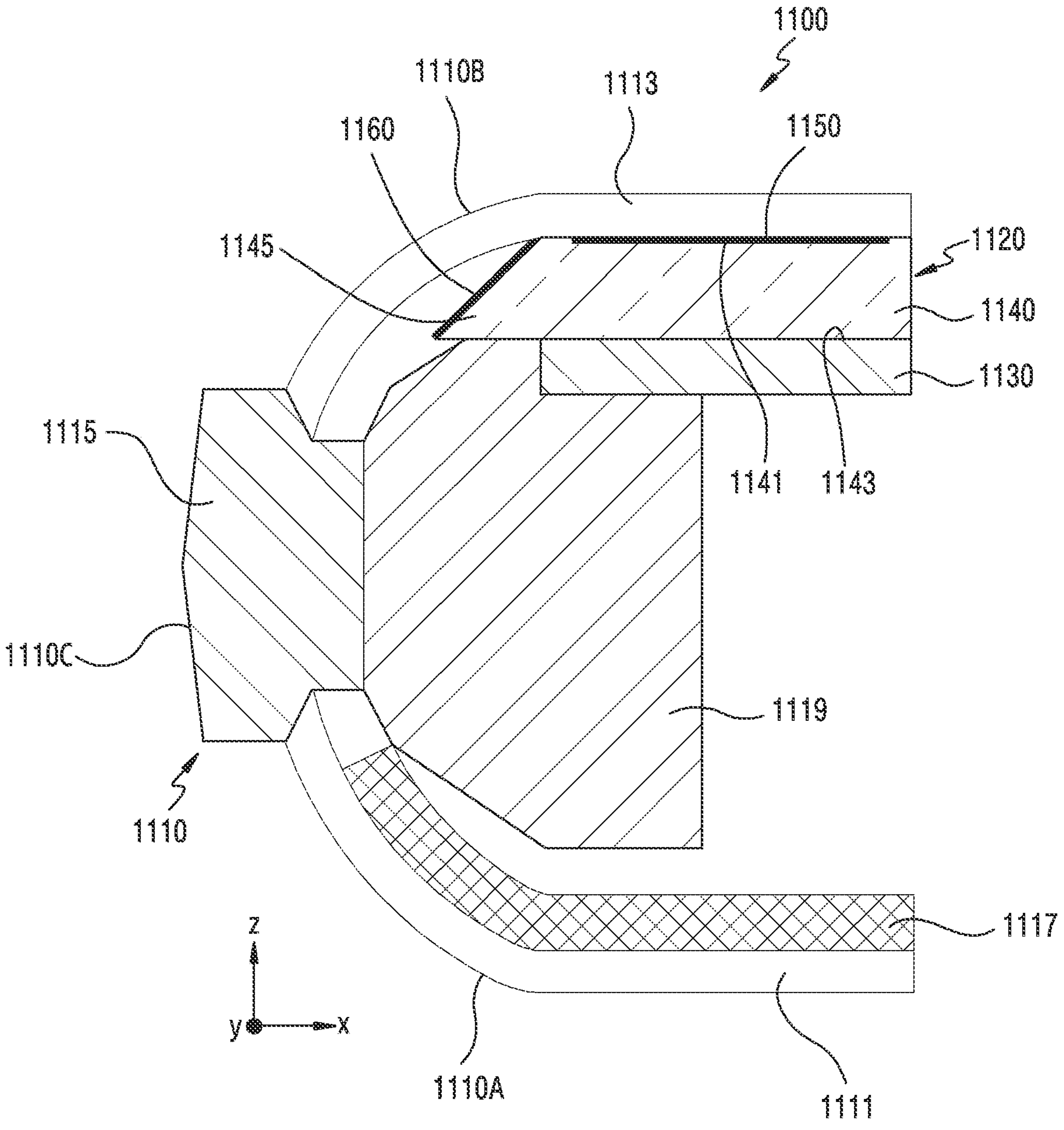
FIG. 11B is a cross-sectional view illustrating an arrangement of a communication device in an electronic device according to an embodiment of the disclosure.

FIG. 11A is a perspective view illustrating an arrangement of a communication device in an electronic device according to an embodiment of the disclosure. FIG. 11B is a cross-sectional view illustrating an arrangement of a communication device in an electronic device according to an embodiment of the disclosure.

Referring to FIG. 11A and FIG. 11B, an electronic device 1100 according to an embodiment may include a housing 1110 (e.g., the housing 310 of FIG. 3A), a display 1117 (e.g., the display 301 of FIG. 3A or the display 323 of FIG. 3C), a first support member 1119 (e.g., the support member 321 of FIG. 3C), and a communication device 1120.

According to an embodiment, the housing 1110 may include a first face (or a front face) 1110A (e.g., the first face 310A of FIG. 3A), a second face (or a back face) 1110B (e.g., the second face 310B of FIG. 3B), and a third face (or a side face) 1110C (e.g., the side face 310C of FIG. 3A). The first face 1110A may include a front plate 1111 (e.g., the front plate 302 of FIG. 3A or the front plate 322 of FIG. 3C), the second face 1110B may include a back plate 1113 (e.g., the back plate 311 of FIG. 3B or the back plate 328 of FIG. 3C), and the third face 1110C may include a side bezel structure (or a side member) 1115 (e.g., the side bezel structure 318 of FIG. 3A or the side bezel structure 321 of FIG. 3C). According to an embodiment, a signal transmitted/received in the communication device 1120 may pass through at least part of the housing 1110. For this, in at least part of the housing 1110, the front plate 1111 and the back plate 1113 may include, for example, coated or colored glass, ceramic, and polymer, or by combining at least two of these materials. According to an embodiment, in at least part of the housing 1110, the side bezel structure 1115 may include metal (e.g., aluminum, stainless steel (STS), or magnesium).

According to an embodiment, the display 1117 may be disposed inside the electronic device 1100, and thus may be disposed adjacent to the first face 1110A of the housing 1110. The display 1117 may be coupled with the front plate 1111. For example, the display 1117 may be coupled between the front plate 1111 and the first support member 1119.

According to an embodiment, the first support member 1119 may be disposed inside the electronic device 1100, and thus may be disposed between the front plate 1111 and back plate 1113 of the housing 1110. The first support member 1119 may be coupled with the side bezel structure 1115 or may be integrated with the side bezel structure 1115.

According to an embodiment, the communication device 1120 may include a communication circuit 1130 (e.g., the communication circuit 510 of FIG. 5A, FIG. 5B, and FIG. 5C) and a PCB 1140 (e.g., the PCB 520 of FIG. 5A, FIG. 5B, and FIG. 5C). The PCB 1140 may include a front face 1141 (e.g., the front face 521 of FIG. 5A, FIG. 5B, and FIG. 5C), a back face 1143 (e.g., the back face 523 of FIG. 5A, FIG. 5B, and FIG. 5C) on which the communication circuit 1130 is disposed, and at least one side face 1145 (e.g., the side face 525 of FIG. 5A, FIG. 5B, and FIG. 5C) having an inclined manner between the front face 1141 and the back face 1145. According to an embodiment, the PCB 1140 may include a first antenna array 1150 (e.g., the first antenna array 530 of FIG. 5A, FIG. 5B, and FIG. 5C) and a second antenna array 1160 (e.g., the second antenna array 540 of FIG. 5A, FIG. 5B, and FIG. 5C). The first antenna array 1150 may be formed on the front face 1141 and the second antenna array 1160 may be formed on the side face 1145.

According to an embodiment (not shown), as shown in the example of FIG. 7B, the communication device 1120 may further include one or more antennas (e.g., an antenna array) disposed on a region (not shown) (e.g., the region 747 or 748 of FIG. 7B) of the back face 1143 corresponding to at least one side face 1145 having an inclined manner on the PCB 1140. For example, the region of the back face 1143 corresponding to the at least one side face 1145 may include at least part of an outer region of the back face 1143.

According to an embodiment, the communication device 1120 may be disposed inside the electronic device 1100, and thus may be disposed adjacent to at least part of the housing 1110. For example, the communication device 1120 may be coupled with the first support member 1119. The front face 1141 of the PCB 1140 may be disposed to face the back plate 1113 and the side bezel structure 1115 in at least part of the housing 1110. According to an embodiment, the communication circuit 1130 may transmit/receive at least one signal through at least one of the first antenna array 1150 or the second antenna array 1160. For example, the signal transmitted/received through the first antenna array 1150 and the second antenna array 1160 may pass through the back plate 1113 in at least part of the housing 1110.

Figure 12:
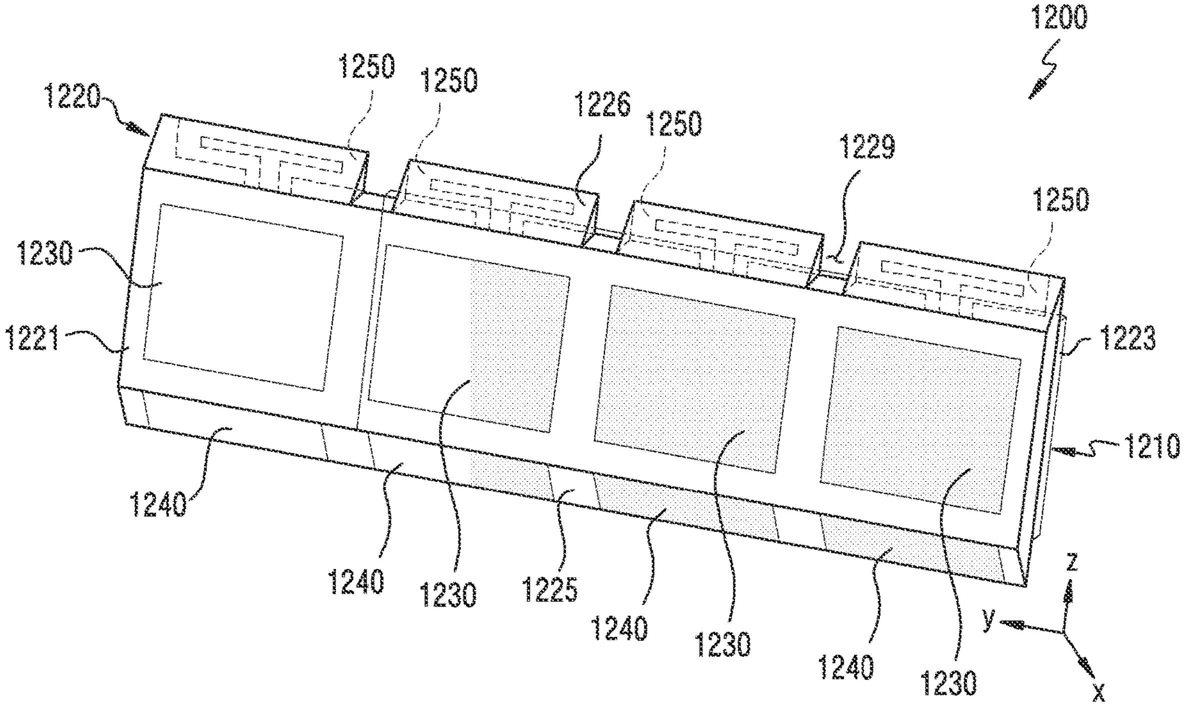
FIG. 12 is a perspective view of a communication device according to an embodiment of the disclosure.

FIG. 12 is a perspective view of a communication device according to an embodiment of the disclosure.

Referring to FIG. 12, a communication device 1200 according to an embodiment may include a communication circuit 1210 (e.g., the communication circuit 510 of FIG. 5A, FIG. 5B, and FIG. 5C or the communication circuit 910 of FIG. 9A, FIG. 9B, and FIG. 9C) or a PCB 1220 (e.g., the PCB 520 of FIG. 5A, FIG. 5B, and FIG. 5C or the PCB 920 of FIG. 9A, FIG. 9B, and FIG. 9C). According to an embodiment, the communication circuit 1210 may be disposed on the PCB 1220.

According to an embodiment, the PCB 1220 may include a front face 1221 (e.g., the front face 521 of FIG. 5A, FIG. 5B, and FIG. 5C or the front face 921 of FIG. 9A, FIG. 9B, and FIG. 9C), a back face 1223 (e.g., the back face 523 of FIG. 5A, FIG. 5B, and FIG. 5C or the back face 923 of FIG. 9A, FIG. 9B, and FIG. 9C) facing away from the front face 1221, and one or more side faces 1225 and 1226 (e.g., the side face 525 or 526 of FIG. 5A, FIG. 5B, and FIG. 5C or the side face 925 or 926 of FIG. 9A, FIG. 9B, and FIG. 9C) having an inclined manner between the front face 1221 and the back face 1223. According to an embodiment, the communication circuit 1210 may be disposed on the back face 1223. According to an embodiment, an area of the front face 1221 may be different from an area of the back face 1223. Accordingly, the side face 1225 may have an inclined manner between the front face 1221 and the back face 1223.

According to an embodiment, the PCB 1220 may include at least one of a first antenna array 1230, a second antenna array 1240, or a third antenna array 1250. According to an embodiment, the first antenna array 1230 may include the first antenna array 530 of FIG. 5A, FIG. 5B, and FIG. 5C or the first antenna array 930 of FIG. 9A, FIG. 9B, and FIG. 9C, the second antenna array 1240 may include the second antenna array 940 (or the third antenna array 950) of FIG. 9A, FIG. 9B, and FIG. 9C, and the third antenna array 1250 may include the second antenna array 540 (or the third antenna array 550) of FIG. 5A, FIG. 5B, and FIG. 5C. For example, an antenna structure of the first antenna array 1230 may be different from an antenna structure of the second antenna array 1240 (or the third antenna array 1250). According to an embodiment, the PCB 1220 may include the first antenna array 1230 and the second antenna array 1240 (or the third antenna array 1250). According to an embodiment, the PCB 1220 may include the second antenna array 1240.

According to an embodiment, the first antenna array 1230 may be formed on at least one of the front face 1221 or the back face 1223. The first antenna array 1230 may include one or more antennas. For example, the first antennas may be patch antennas. According to an embodiment, the first antenna array 1230 may be electrically coupled with the communication circuit 1210. For example, the first antennas may be individually coupled with the communication circuit 1210.

According to an embodiment, the second antenna array 1240 may be formed on the side face 1225. According to an embodiment (not shown), the second antenna array 1240 may extend from the side face 1225 to an outer region of the back face 1223. According to an embodiment (not shown), the second antenna array 1240 may extend from the side face 1225 to an outer region of the front face 1221. The second antenna array 1240 may include one or more antennas. For example, the second antennas may include at least one of a patch antenna, a loop antenna, a dipole antenna, or the like. The second antennas may be disposed by being spaced by a designated interval from each other. According to an embodiment, the second antenna array 1240 may be electrically coupled with the communication circuit 1210. For example, the second antennas may be individually coupled with the communication circuit 1210.

According to an embodiment, the third antenna array 1250 may be formed on a region corresponding to the side face 1226. According to an embodiment, the region (e.g., the side face 525 or 526 of FIG. 5A, FIG. 5B, and FIG. 5C) corresponding to the side face 1226 may include at least part of an outer region of the back face 1223. According to an embodiment, the region corresponding to the side face 1226 may include at least part of the outer region of the front face 1221. According to an embodiment, the region corresponding to the side face 1226 may include at least part of the side face 1226. The third antenna array 1250 may include one or more third antennas. According to an embodiment, the region corresponding to the side face 1226 may include at least one slot region 1229. The slot region 1229 may be formed between any two of the third antennas. For example, the third antennas may include at least one of a patch antenna, a loop antenna, a dipole antenna, or the like. The third antennas may be disposed by being spaced by a designated interval from each other. According to an embodiment, the third antenna array 1250 may be electrically coupled with the communication circuit 1210. For example, the third antennas may be individually coupled with the communication circuit 1210.

Figure 13A:
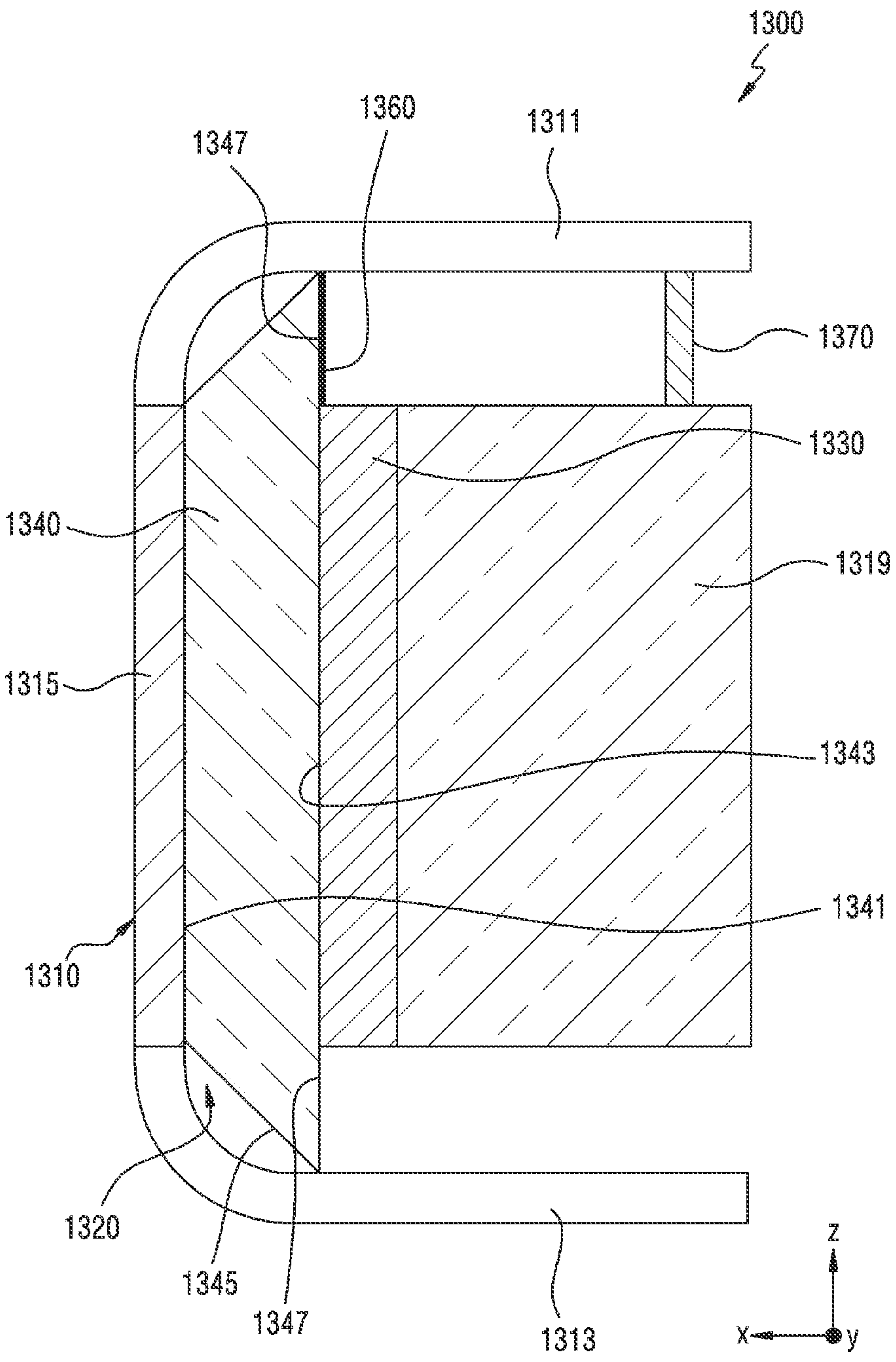
FIG. 13A is a cross-sectional view illustrating an arrangement of a communication device in an electronic device according to an embodiment of the disclosure.

FIG. 13A is a cross-sectional view illustrating an arrangement of a communication device in an electronic device according to an embodiment of the disclosure.

Referring to FIG. 13A, an electronic device 1300 according to an embodiment may include a housing 1310 (e.g., the housing 310 of FIG. 3A), a first support member 1319 (e.g., the support member 321 of FIG. 3C), and a communication device 1320.

According to an embodiment, the housing 1310 may include a front plate 1311 (e.g., the front plate 202 of FIG. 3A or the front plate 322 of FIG. 3C), a back plate 1313 (e.g., the back plate 311 of FIG. 3B or the back plate 328 of FIG. 3C), and a side bezel structure (or a side member) 1315 (e.g., the side bezel structure 318 of FIG. 3A or the side bezel structure 321 of FIG. 3C). According to an embodiment, a signal transmitted/received in the communication device 1320 may pass through at least part of the housing 1310. For this, in at least part of the housing 1310, the front plate 1311 and the back plate 1313 may include, for example, coated or colored glass, ceramic, and polymer, or by combining at least two of these materials. According to an embodiment, in at least part of the housing 1310, the side bezel structure 1315 may include coated or colored glass, ceramic, polymer, and metal (e.g., aluminum, stainless steel (STS), or magnesium), or by combining at least two of these materials.

According to an embodiment, the first support member 1319 may be disposed inside the electronic device 1300, and thus may be disposed between the front plate 1311 and back plate 1313 of the housing 1310. The first support member 1319 may be coupled with the side bezel structure 1315 or may be integrated with the side bezel structure 1315.

According to an embodiment, the communication device 1320 may include a communication circuit 1330 (e.g., the communication circuit 510 of FIG. 5A, FIG. 5B, and FIG. 5C), a PCB 1340 (e.g., the PCB 520 of FIG. 5A, FIG. 5B, and FIG. 5C), and a reflection member 1370. The PCB 1340 may include a front face 1341 (e.g., the front face 521 of FIG. 5A, FIG. 5B, and FIG. 5C), a back face 1343 (e.g., the back face 523 of FIG. 5A, FIG. 5B, and FIG. 5C) on which the communication circuit 1330 is mounted, and at least one side face 1345 (e.g., the side face 525 of FIG. 5A, FIG. 5B, and FIG. 5C) having an inclined manner between the front face 1341 and the back face 1343. According to an embodiment, the PCB 1340 may include a second antenna array 1360 (e.g., the second antenna array 540 or third antenna array 550 of FIG. 5A, FIG. 5B, and FIG. 5C). The second antenna array 1360 may be formed on a region 1347 (e.g., the region 527 or 528 of FIG. 5A, FIG. 5B, and FIG. 5C) corresponding to the side face 1325. According to an embodiment, the region 1347 corresponding to the side face 1345 may include at least part of an outer region of the back face 1343.

According to an embodiment, the second antenna array 1360 may be integrated in at least part of the side face 1345. According to an embodiment, the reflection member 1370 may be spaced apart from the PCB 1340 and may be disposed to face the second antenna array 1360. The reflection member 1370 may be disposed in parallel with the region 1347 corresponding to the side face 1345. For example, the reflection member 1370 may include metal (e.g., aluminum, stainless steel (STS), or magnesium).

According to an embodiment, the communication device 1320 may be disposed inside the electronic device 1300, and thus may be disposed adjacent to at least part of the housing 1310. For example, the communication device 1320 may be coupled with the first support member 1319. The front face 1341 of the PCB 1340 may be disposed to face the side bezel structure 1315 in at least part of the housing 1310, and the side face 1345 of the PCB 1340 may be disposed to face at least one of the front plate 1311 or the back plate 1313 in at least part of the housing 1310. According to an embodiment, the reflection member 1370 may be spaced apart from the PCB 1340 and may be disposed to face the second antenna array 1360. For example, the reflection member 1370 may be coupled with at least one of the first support member 1319, the front plate 1311, or the back plate 1313. According to an embodiment, the communication circuit 1330 may transmit/receive at least one signal through the second antenna array 1360. The signal transmitted/received through the second antenna array 1360 may be reflected to the reflection member 1370. Accordingly, the signal transmitted/received through the second antenna array 1360 may pass through at least one of the front plate 1311 or the back plate 1313 in at least part of the housing 1310.

Figure 13B:
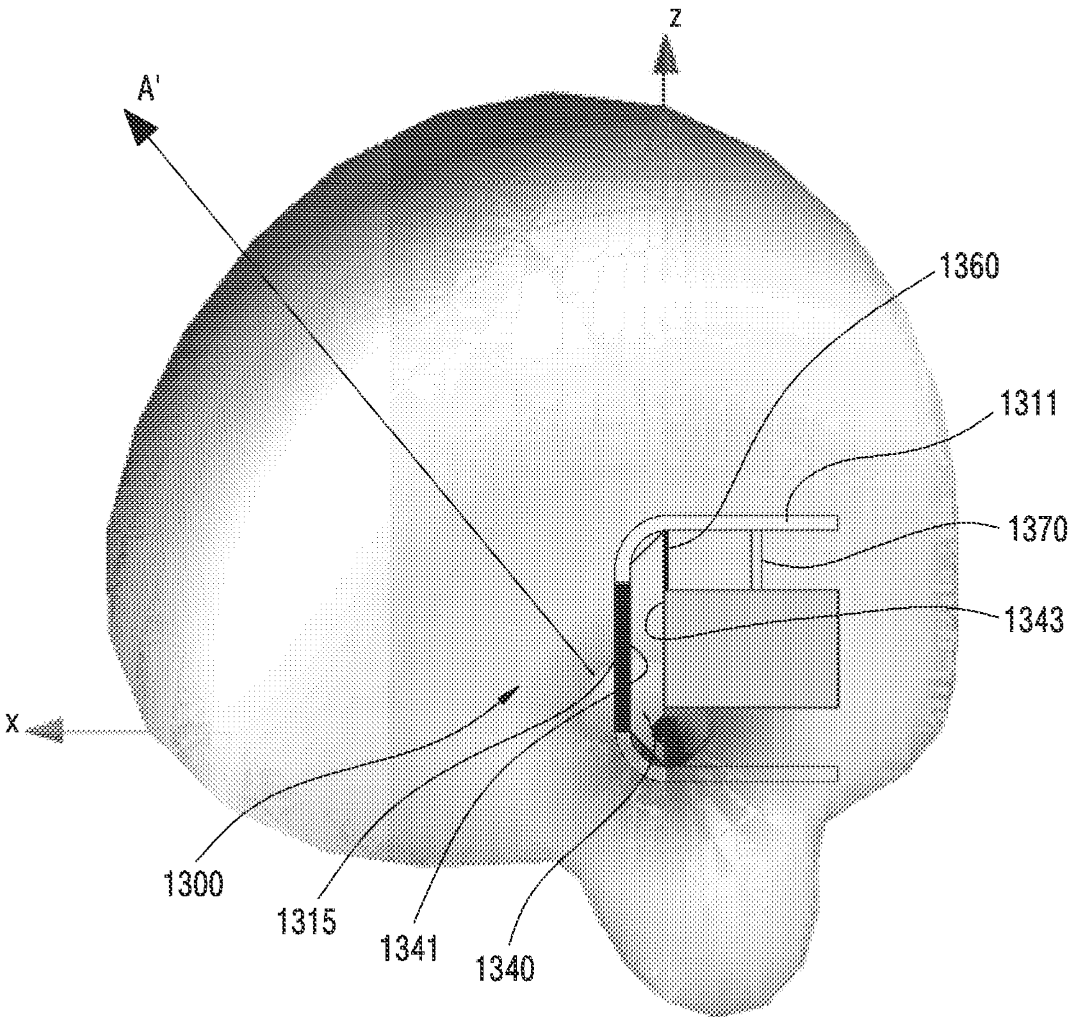
FIG. 13B illustrates a radiation pattern of a second antenna array in a communication device of an electronic device according to an embodiment of the disclosure.

FIG. 13B illustrates a radiation pattern of a second antenna array in a communication device of an electronic device according to an embodiment of the disclosure.

Referring to FIG. 13B, the communication device 1320 of the electronic device 1300 according to an embodiment may transmit/receive a signal through a beam formed by the second antenna array 1360. A direction A of the beam formed by the second antenna array 1360 may be switched by the reflection member 1370. A direction A' of a beam switched by the reflection member 1370 may be inclined between a first axis (e.g., an X-axis) which passes through the front face 1341 and back face 1343 of the PCB 1340 and a second axis (e.g., a Y-axis) and third axis (e.g., a Z-axis) perpendicular to the first axis. For example, the direction A' of the beam switched by the reflection member 1370 may pass through the side bezel structure 1315.

Figure 14A:
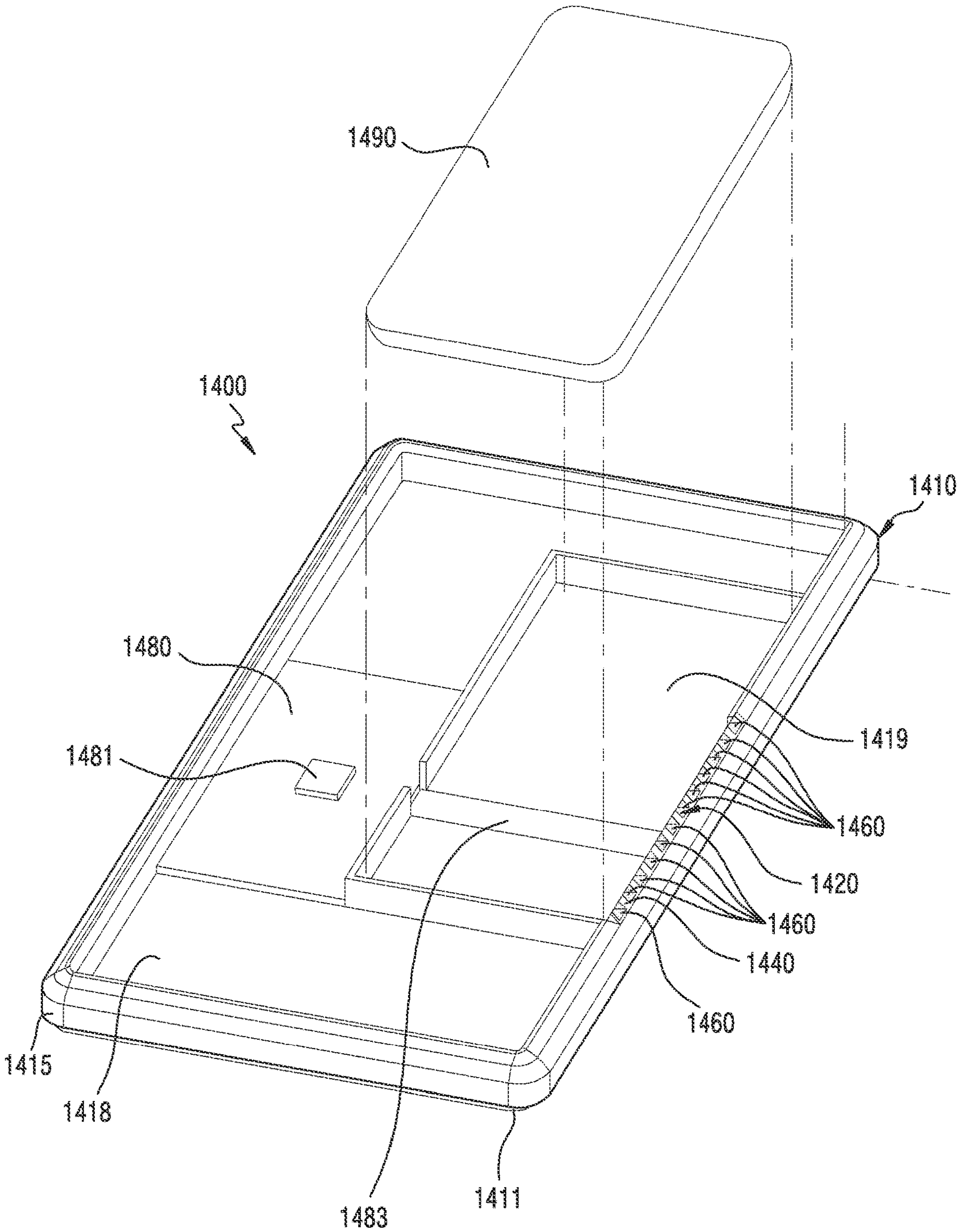
FIG. 14A is a perspective view illustrating an arrangement of a communication device in an electronic device according to an embodiment of the disclosure.
Figure 14B:
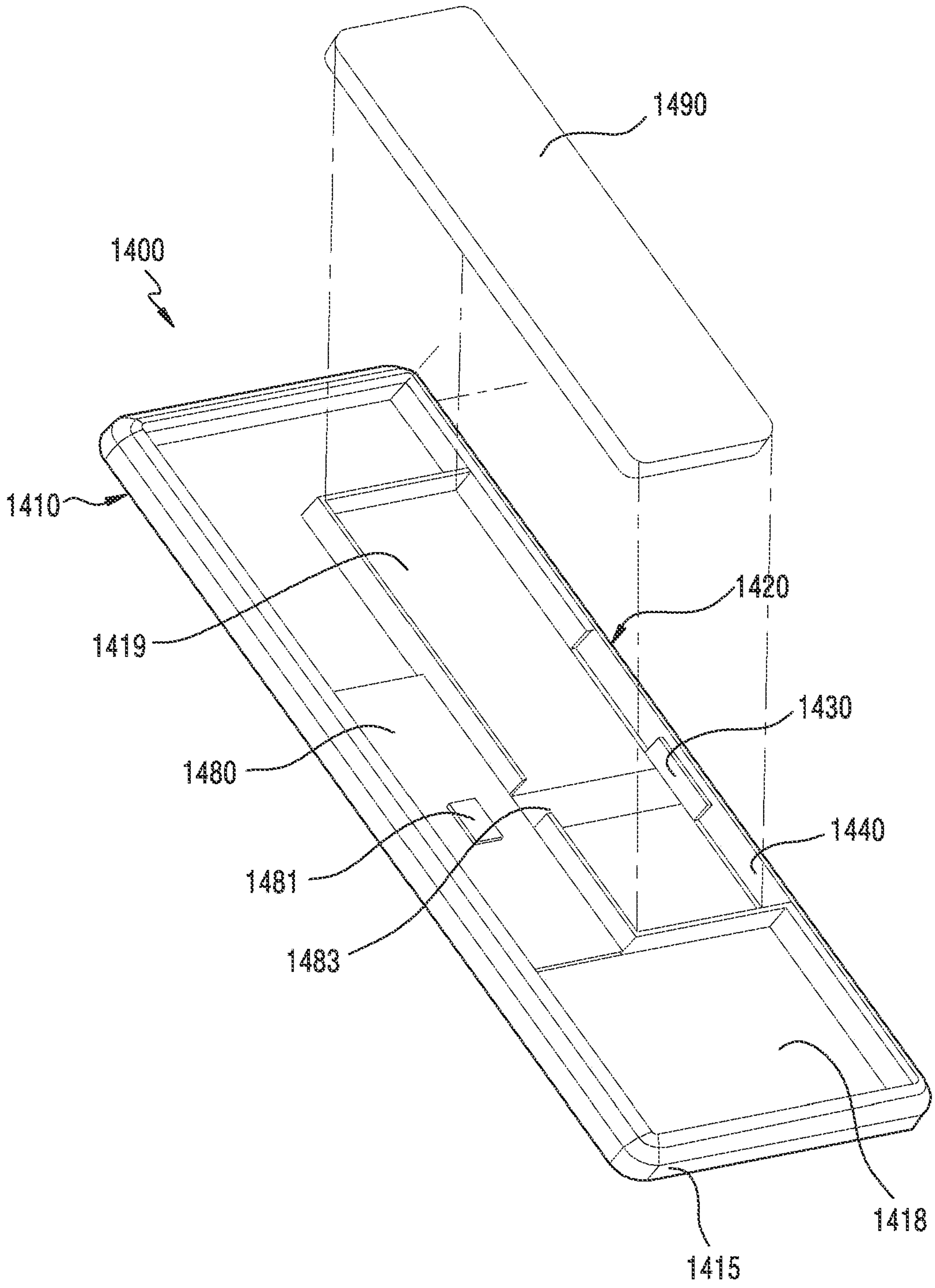
FIG. 14B is a perspective view illustrating an arrangement of a communication device in an electronic device according to an embodiment of the disclosure.
Figure 14C:
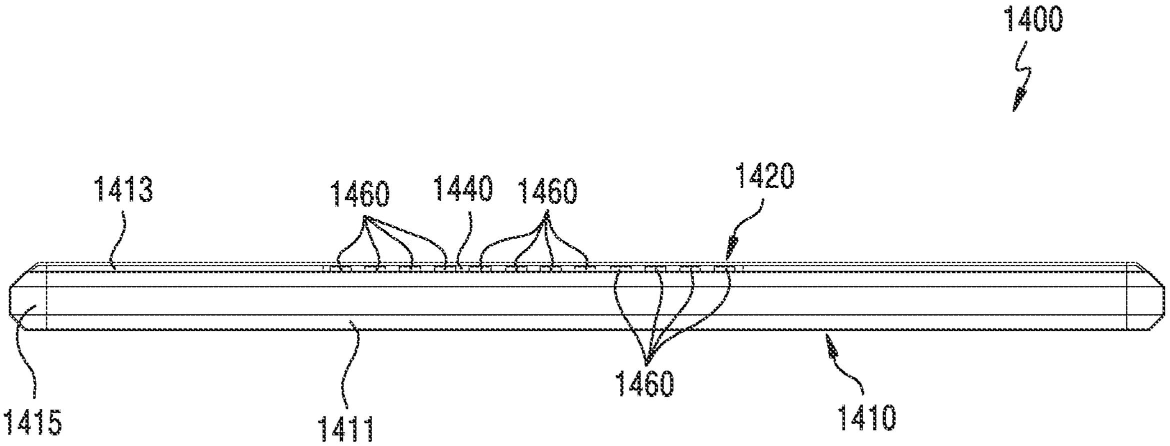
FIG. 14C is a side view illustrating an arrangement of a communication device in an electronic device according to an embodiment of the disclosure.

FIG. 14A and FIG. 14B are perspective views illustrating an arrangement of a communication device in an electronic device according to an embodiment of the disclosure. FIG. 14C is a side view illustrating an arrangement of a communication device in an electronic device according to an embodiment of the disclosure.

Referring to FIG. 14A, FIG. 14B, and FIG. 14C, an electronic device 1400 according to an embodiment may include a housing 1410 (e.g., the housing 1310 of FIG. 13A), a first support member 1418 (e.g., the first support member 1319 of FIG. 13A), a communication device 1420 (e.g., the communication device 1320 of FIG. 13A), a processor 1480 (e.g., the PCB 324 of FIG. 3C or the processor 440 of FIG. 4A), a communication module 1481 (e.g., the communication module 450 of FIG. 4A), and a battery 1490 (e.g., the battery 325 of FIG. 3C).

According to an embodiment, the housing 1410 may include a front plate 1411 (e.g., the front plate 1311 of FIG. 13A), a back plate 1413 (e.g., the back plate 1313 of FIG. 13A), and a side bezel structure (or a side member) 1415 (e.g., the side bezel structure 1315 of FIG. 13A). According to an embodiment, a signal transmitted/received in the communication device 1420 may pass through at least part of the housing 1410.

According to an embodiment, the first support member 1418 may be disposed inside the electronic device 1400, and thus may be disposed between the front plate 1411 and back plate 1413 of the housing 1410. The first support member 1418 may be coupled with the side bezel structure 1415 or may be integrated with the side bezel structure 1415. According to an embodiment, the first support member 1418 may include a container 1419 for accompanying the battery 1490. The container 1419 may include a side wall surrounding a space of a size corresponding to the battery 1490.

According to an embodiment, the communication device 1420 may include a communication circuit 1430 (e.g., the communication circuit 1330 of FIG. 13A) and a PCB 1440 (e.g., the PCB 1340 of FIG. 13A). The PCB 1440 may include a front face (e.g., the front face 1341 of FIG. 13A), a back face (e.g., the back face 1343 of FIG. 13A) on which the communication circuit 1430 is mounted, and at least one side face (e.g., the side face 1345 of FIG. 13A) having an inclined manner between the front face and the back face. According to an embodiment, the PCB 1440 may include a second antenna array 1460 (e.g., the second antenna array 1360 of FIG. 13A). According to an embodiment, the second antenna array 1460 may be formed on at least part of the side face.

According to an embodiment, the communication device 1420 may be disposed inside the electronic device 1400, and thus may be disposed adjacent to at least part of the housing 1410. For example, the communication device 1420 may be coupled with the first support member 1419. The front face of the PCB 1440 may be disposed to face the side bezel structure 1415 in at least part of the housing 1410, and a side face of the PCB 1440 may be disposed to face at least one of the front plate 1411 or the back plate 1413 in at least part of the housing 1410.

According to an embodiment, the processor 1440 may include one or more of a central processing unit, a Graphics Processing Unit (GPU), an image signal processor of a camera, a baseband processor (or a Communication Processor (CP)), or the like. According to an embodiment, the processor 1440 may be implemented as an SoC, an SIP, or the like. According to an embodiment, the processor 1480 may be coupled with the first support member 1418. The processor 1480 may be disposed by being spaced apart from the communication device 1420, with the container 1419 being disposed therebetween.

According to an embodiment, the communication module 1481 may be electrically coupled with the communication device 1420 by using a conductive line 1483. The communication module 1481 may include, for example, a baseband processor or at least one communication circuit (e.g., an IFIC or an RFIC). The conductive line 1483 may include, for example, a coaxial cable, an FPCB, or the like. According to an embodiment, the communication module 1481 may be coupled with at least one of the processor 1480 or the first support member 1418. The communication module 1481 may be disposed by being spaced apart from the communication device 1420, with the container 1419 being disposed therebetween. According to an embodiment, the conductive line 1483 may be disposed on the container 1419 to couple the communication module 1481 and the communication circuit 1430 of the communication device 1420.

According to an embodiment, the battery 1490 may be a device for supplying power to at least one component of the electronic device 1400, and may include, for example, a primary cell which is not rechargeable, a secondary cell which is rechargeable, a fuel cell, or the like. According to an embodiment, the battery 1490 may be coupled with the first support member 1418. The battery 1490 may be inserted to the container 1419. According to an embodiment, the battery 1490 may support the communication device 1420. According to an embodiment, the battery 1490 may be spaced apart from the PCB 1440 of the communication device 1420. According to an embodiment, a reflection member (e.g., the reflection member 1370 of FIG. 13A) may be formed on part of a surface of the battery 1490. The part of the surface of the battery 1490 may be formed to face the second antenna array 1460, and the reflection member may be attached to the part of the surface of the battery 1490. For example, the reflection member may be disposed in parallel with the side face of the PCB 1440.

According to an embodiment, the communication circuit 1430 may transmit/receive at least one signal through the second antenna array 1460. The signal transmitted/received through the second antenna array 1460 may be reflected to the reflection member of the part of the surface of the battery 1490. Accordingly, the signal transmitted/received through the second antenna array 1460 may pass through at least one of the front plate 1411 or the back plate 1413 in at least part of the housing 1410.

Figure 14D:
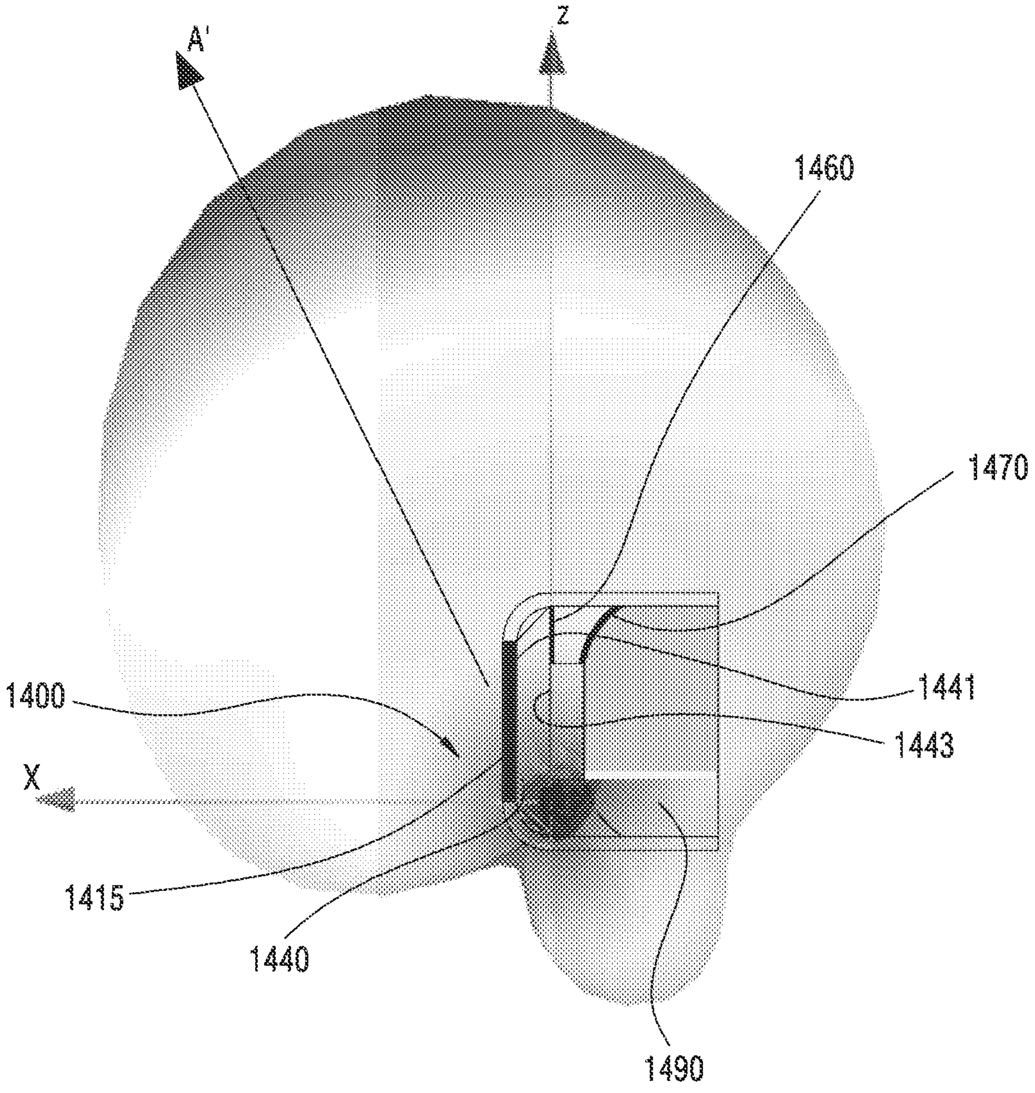
FIG. 14D illustrates a radiation pattern of a second antenna array in a communication device of an electronic device according to an embodiment of the disclosure.

FIG. 14D illustrates a radiation pattern of a second antenna array in a communication device of an electronic device according to an embodiment of the disclosure.

Referring to FIG. 14D, the communication device 1420 of the electronic device 1400 according to an embodiment may transmit/receive a signal through a beam formed by the second antenna array 1460. A direction A of the beam formed by the second antenna array 1460 may be switched by a reflection member 1470 of the battery 1490. A direction A' of a beam switched by the battery 1490 may be inclined between a first axis (e.g., an X-axis) which passes through a front face 1441 and a back face 1443 of the PCB 1440 and a second axis (e.g., a Y-axis) and third axis (e.g., a Z-axis) perpendicular to the first axis. For example, the direction A' of the beam switched by the battery 1490 may pass through the side bezel structure 1415.

An antenna assembly (e.g., 500, 620, 720, 900, 1020, 1120, 1200, 1320, or 1420) according to an embodiment may include a communication circuit (e.g., 510, 630, 730, 910, 1030, 1130, 1210, 1330, or 1430) and a PCB (e.g., 520, 640, 740, 920, 1040, 1140, 1220, 1340, or 1440) including a front face (e.g., 521, 641, 741, 921, 1041, 1141, 1221, 1341, or 1441), a back face (e.g., 523, 643, 743, 923, 1043, 1143, 1223, 1343, or 1443) on which the communication circuit (e.g., 510, 630, 730, 910, 1030, 1130, 1210, 1330, or 1430) is disposed, and at least one side face (e.g., 525, 516, 645, 646, 745, 746, 925, 926, 1045, 1145, 1225, 1345, or 1445) having an inclined manner between the front face (e.g., 521, 641, 741, 921, 1041, 1141, 1221, 1341, or 1441) and the back face (e.g., 523, 643, 743, 923, 1043, 1143, 1223, 1343, or 1443).

According to an embodiment, the PCB (e.g., 520, 640, 740, 920, 1040, 1140, 1220, 1340, or 1440) may include one or more first antennas (e.g., the first antenna array 530, 650, 930, 1150, or 1230) electrically coupled with the communication circuit (e.g., 510, 630, 730, 910, 1030, 1130, 1210, 1330, or 1430) and formed on at least one of the front face (e.g., 521, 641, 741, 921, 1041, 1141, 1221, 1341, or 1441) or the back face (e.g., 523, 643, 743, 923, 1043, 1143, 1223, 1343, or 1443) and one or more second antennas (e.g., the second antenna array 540, 660, 760, 940, 1060, 1160, 1240, 1360, or 1460) (or the third antenna array 550, 670, 770, or

950) formed on a region corresponding to the at least one side face (e.g., 525, 526, 645, 646, 745, 746, 925, 926, 1045, 1145, 1225, 1345, or 1445).

According to an embodiment, a region (e.g., 527, 528, 647, 648, 747, 748, or 1347) corresponding to the at least one side face (e.g., 525, 526, 645, 646, 745, 746, 1225, or 1345) may include at least part of an outer region of the front face (e.g., 521, 641, 741, 1221, or 1341) or the back face (e.g., 523, 643, 743, 1223, or 1343).

According to an embodiment, a region corresponding to the at least one side face (e.g., 925, 1045, 1145, 1225, or 1445) may include at least part of the at least one side face (e.g., 925, 1045, 1145, 1225, or 1445).

According to an embodiment, the antenna assembly (e.g., 500, 620, 720, 900, 1020, 1120, 1200, 1320, or 1420) may further include a reflection member (e.g., 1370, 1470) spaced apart from the PCB (e.g., 520, 540, 740, 920, 1040, 1140, 1220, 1340, or 1440) and disposed to face the second antennas (e.g., the second antenna array 540, 660, 760, 940, 1060, 1160, 1240, 1360, or 1460) (or the third antenna array 550, 670, 770, or 950).

According to an embodiment, a region corresponding to the at least one side face (e.g., 525, 526, 645, 646, 745, 746, 925, 926, 1045, 1145, 1225, 1345, or 1445) may include a slot region (e.g., 1229) formed between any two neighboring antennas among the second antennas (e.g., the second antenna array 540, 660, 760, 940, 1060, 1160, 1240, 1360, or 1460) (or the third antenna array 550, 670, 770, or 950).

According to an embodiment, the first antennas (e.g., the first antenna array 530, 650, 930, 1150, or 1230) and the second antennas (e.g., the second antenna array 540, 660, 760, 940, 1060, 1160, 1240, 1360, or 1460) (or the third antenna array 550, 670, 770, or 950) may be formed with different antenna structures.

The electronic device (e.g., 600, 700, 1000, 1100, 1300, or 1400) according to an embodiment may include the housing (e.g., 610, 710, 1010, 1110, 1310, or 1410) at least partially including metal, the communication circuit (e.g., 410, 630, 730, 910, 1030, 1130, 1210, 1330, or 1430), and the PCB (e.g., 420, 640, 740, 920, 1040, 1140, 1220, 1340, or 1440) including the front face (e.g., 421, 641, 741, 921, 1041, 1141, 1221, 1341, or 1441), the back face (e.g., 423, 643, 743, 923, 1043, 1143, 1223, 1343, or 1443) on which the communication circuit (e.g., 410, 630, 730, 910, 1030, 1130, 1210, 1330, or 1430) is disposed, and the at least one side face (e.g., 525, 526, 645, 646, 745, 746, 925, 926, 1045, 1145, 1225, 1345, or 1445) having an inclined manner between the front face (e.g., 421, 641, 741, 921, 1041, 1141, 1221, 1341, or 1441) and the back face (e.g., 423, 643, 743, 923, 1043, 1143, 1223, 1343, or 1443).

According to an embodiment, the PCB (e.g., 520, 640, 740, 920, 1040, 1140, 1220, 1340, or 1440) may include one or more antennas (e.g., the second antenna array 540, 660, 760, 940, 1060, 1160, 1240, 1360, or 1460, or the third antenna array 550, 670, 770, or 950) formed on a region corresponding to the at least one side face (e.g., 525, 526, 645, 646, 745, 746, 925, 926, 1045, 1145, 1225, 1345, or 1445), and may be disposed adjacent to the at least part of the housing (e.g., 510, 710, 1010, 1110, 1310, or 1410).

According to an embodiment, a region corresponding to the at least one side face (e.g., 525, 526, 645, 646, 745, 746, 925, 926, 1045, 1145, 1225, 1345, or 1445) may include at least part of an outer region of the front face (e.g., 521, 641, 741, 921, 1041, 1141, 1221, 1341, or 1441) or the back face (e.g., 523, 643, 743, 923, 1043, 1143, 1223, 1343, or 1443).

According to an embodiment, the front face (e.g., 521, 641, 741, 921, 1041, 1141, 1221, 1341, or 1441) may be disposed to face the at least part of the housing (e.g., 510, 710, 1010, 1110, 1310, or 1410).

According to an embodiment, the electronic device (e.g., 500, 700, 1000, 1100, 1300, or 1400) may further include the reflection member (e.g., 1370, 1470) spaced apart from the PCB (e.g., 520, 640, 740, 920, 1040, 1140, 1220, 1340, or 1440) and disposed to face the antennas (e.g., 540, 550, 660, 670, 760, 770, 940, 950, 1060, 1160, 1240, 1360, or 1460).

According to an embodiment, the electronic device (e.g., 600, 700, 1000, 1100, 1300, or 1400) may further include a battery (e.g., 1490) including a surface on which the reflection member (e.g., 1370, 1470) is formed.

According to an embodiment, the back face (e.g., 523, 643, 743, 923, 1043, 1143, 1223, 1343, or 1443) may be disposed to face the at least part of the housing (e.g., 510, 710, 1010, 1110, 1310, or 1410).

According to an embodiment, a region corresponding to the at least one side face (e.g., 525, 526, 645, 646, 745, 746, 925, 926, 1045, 1145, 1225, 1345, or 1445) may include the slot region (e.g., 1229) formed between any two neighboring antennas among the antennas (e.g., the second antenna array 540, 660, 760, 940, 1060, 1160, 1240, 1360, or 1460 or the third antenna array 550, 670, 770, or 950).

According to an embodiment, the PCB (e.g., 520, 640, 740, 920, 1040, 1140, 1220, 1340, or 1440) may further include one or more different antennas (e.g., the first antenna array 530, 650, 930, 1150, or 1230) formed on at least one of the front face (e.g., 521, 641, 741, 921, 1041, 1141, 1221, 1341, or 1441) or the back face (e.g., 523, 643, 743, 923, 1043, 1143, 1223, 1343, or 1443).

The electronic device (e.g., 600, 700, 1000, 1100, 1300, or 1400) according to an embodiment may include the communication circuit (e.g., 510, 630, 730, 910, 1030, 1130, 1210, 1330, or 1430) and the PCB (e.g., 520, 640, 740, 920, 1040, 1140, 1220, 1340, or 1440) including the front face (e.g., 521, 641, 741, 921, 1041, 1141, 1221, 1341, or 1441), the back face (e.g., 523, 643, 743, 923, 1043, 1143, 1223, 1343, or 1443) on which the communication circuit (e.g., 510, 630, 730, 910, 1030, 1130, 1210, 1330, or 1430) is disposed, and the at least one side face (e.g., 525, 526, 645, 646, 745, 746, 925, 926, 1045, 1145, 1225, 1345, or 1445) having an inclined manner between the front face (e.g., 521, 641, 741, 921, 1041, 1141, 1221, 1341, or 1441) and the back face (e.g., 523, 643, 743, 923, 1043, 1143, 1223, 1343, or 1443).

According to an embodiment, the PCB (e.g., 520, 640, 740, 920, 1040, 1140, 1220, 1340, or 1440) may include one or more first antennas (e.g., the first antenna array 530, 650, 930, 1150, or 1230) electrically coupled with the communication circuit (e.g., 510, 630, 730, 910, 1030, 1130, 1210, 1330, or 1430) and formed on at least one of the front face (e.g., 521, 641, 741, 921, 1041, 1141, 1221, 1341, or 1441) or the back face (e.g., 523, 643, 743, 923, 1043, 1143, 1223, 1343, or 1443) and one or more second antennas (e.g., the second antenna array 540, 660, 760, 940, 1060, 1160, 1240, 1360, or 1460 or the third antenna array 550, 670, 770, or 950) formed on the at least one side face (e.g., 525, 526, 645, 646, 745, 746, 925, 926, 1045, 1145, 1225, 1345, or 1445).

According to an embodiment, the electronic device (e.g., 600, 700, 1000, 1100, 1300, or 1400) may further include the housing (e.g., 610, 710, 1010, 1110, 1310, or 1410) at least partially formed of metal and disposed adjacent to the PCB (e.g., 520, 640, 740, 920, 1040, 1140, 1220, 1340, or 1440).

According to an embodiment, the front face (e.g., 521, 641, 741, 921, 1041, 1141, 1221, 1341, or 1441) may be disposed to face the at least part of the housing (e.g., 610, 710, 1010, 1110, 1310, or 1410).

According to an embodiment, the back face (e.g., 523, 643, 743, 923, 1043, 1143, 1223, 1343, or 1443) may be disposed to face the at least part of the housing (e.g., 610, 710, 1010, 1110, 1310, or 1410).

According to an embodiment, the electronic device (e.g., 600, 700, 1000, 1100, 1300, or 1400) may further include the reflection member (e.g., 1370, 1470) spaced apart from the PCB (e.g., 520, 640, 740, 920, 1040, 1140, 1220, 1340, or 1440) and disposed to face the second antennas (e.g., the second antenna array 540, 660, 760, 940, 1060, 1160, 1240, 1360, or 1460 or the third antenna array 550, 670, 770, or 950).

According to an embodiment, a region corresponding to the at least one side face (e.g., 525, 526, 645, 646, 745, 746, 925, 926, 1045, 1145, 1225, 1345, or 1445) may include the slot region (e.g., 1229) formed between any two neighboring antennas among the second antennas (e.g., the second antenna array 540, 660, 760, 940, 1060, 1160, 1240, 1360, or 1460 or the third antenna array 550, 670, 770, or 950).

In a communication device according to an embodiment, antennas are formed on an inclined side face of a PCB, thereby controlling a direction of a beam formed for signal transmission/reception in the antennas. Therefore, even if the communication device is disposed on the electronic device, the beam may be formed such that the direction of the beam deviates from the metal of the housing. Accordingly, the antennas in the communication device can be prevented from degradation of radiation performance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:

a housing including a side member forming a side surface of the portable communication device;

a battery accommodated in the housing and disposed adjacent to a first portion of the side member;

an antenna assembly disposed between the first portion of the side member and the battery, the antenna assembly including:

a first printed circuit board (PCB) disposed substantially parallel with the first portion of the side member, a first antenna array disposed on at least a portion of the first PCB such that a beam radiated via the first antenna array is directed substantially toward the first portion of the side member, and a radio frequency integrated circuit (RFIC) disposed at a second side of the first PCB opposite to a first side of the first PCB substantially facing the first portion of the side member;

a conductive supporting member disposed between the RFIC and the battery, and connected to the side member; and a second PCB disposed between the battery and a second portion of the side member opposite to the first portion of the side member, wherein the second PCB is electrically connected with the first PCB via a flexible printed circuit board (FPCB) disposed along a surface of the battery, and wherein at least a portion of the first portion of the side member includes colored glass.

2. The portable communication device of claim 1, wherein the conductive supporting member is in contact with the RFIC.

3. The portable communication device of claim 1, further comprising:

a reflection member disposed in contact with the conductive supporting member.

4. The portable communication device of claim 1, further comprising:

a second antenna array disposed as substantially facing a rear surface of the portable communication device such that a beam radiated via the second antenna array is directed substantially toward the rear surface.

5. The portable communication device of claim 4, further comprising:

a third antenna array disposed as substantially facing a front surface of the portable communication device such that a beam radiated via the third antenna array is directed substantially toward the front surface.

6. The portable communication device of claim 1, wherein the second PCB includes a processor disposed thereon and electrically connected with the RFIC disposed at the second side of the first PCB.

7. The portable communication device of claim 6, wherein the processor is connected with the RFIC via the FPCB.

8. The portable communication device of claim 6, wherein the processor forms at least part of an intermediate frequency integrated circuit (IFIC).

9. The portable communication device of claim 6, wherein the first PCB and the second PCB are disposed such that the first PCB is at least partially overlapped with the second PCB when viewed in a direction from the first portion to the second portion.

10. A portable communication device comprising:

a housing including a front plate, a rear plate, and a bezel structure forming an exterior of the portable communication device, wherein the bezel structure includes conductive material and non-conductive material, wherein the bezel structure further includes a first part, a second part, and a side part, and wherein a portion of the side part of the bezel structure is configured to be a part of an antenna;

an antenna assembly disposed adjacent the side part of the bezel structure, the antenna assembly including:

a first printed circuit board (PCB) disposed substantially parallel with the side part of the bezel structure, a first array antenna disposed on at least a portion of the first PCB such that a beam radiated from the first array antenna is directed substantially through a portion of the side part of the bezel structure including colored glass, and a radio frequency integrated circuit (RFIC) disposed at a second side of the first PCB opposite to a first side of the first PCB substantially facing the side part of the bezel structure; and a second PCB accommodated in the housing and including a communication processor (CP), wherein the CP is electrically connected with the first PCB via a flexible printed circuit board (FPCB).

11. The portable communication device of claim 10, further comprising:

a battery accommodated in the housing.

12. The portable communication device of claim 11, further comprising:

a conductive supporting member disposed between the RFIC and the battery, and connected to the side part, wherein the conductive supporting member is in contact with the RFIC.

13. The portable communication device of claim 12, further comprising:

a reflection member disposed in contact with the conductive supporting member.

14. The portable communication device of claim 10, further comprising:

a second array antenna disposed as substantially facing the rear plate of the portable communication device such that a beam radiated via the second array antenna is directed substantially toward the rear plate.

15. The portable communication device of claim 14, further comprising:

a third array antenna disposed as substantially facing the front plate of the portable communication device such that a beam radiated via the third array antenna is directed substantially toward the front plate.

16. The portable communication device of claim 10, wherein the second PCB includes a processor disposed thereon and electrically connected with the RFIC disposed at the second side of the first PCB.

17. The portable communication device of claim 16, wherein the processor is connected with the RFIC via the FPCB.

18. The portable communication device of claim 16, wherein the processor forms at least part of an intermediate frequency integrated circuit (IFIC).

19. The portable communication device of claim 16, wherein the first PCB and the second PCB are disposed such that the first PCB is at least partially overlapped with the second PCB.

20. The portable communication device of claim 1, wherein the first antenna array is included in the first PCB.

* * * * *